United States Patent
Hämäläinen et al.

(10) Patent No.: US 7,543,152 B2
(45) Date of Patent: Jun. 2, 2009

(54) METHODS AND ARRANGEMENTS FOR REALISING BETTING WITH OFF-LINE TERMINALS

(75) Inventors: Timo Hämäläinen, Kangasala (FI); Risto Rautee, Helsinki (FI); Marko Hännikäinen, Tampere (FI); Janne Rekonius, N kia (FI)

(73) Assignee: Innoka Oy, Vantaa (FI)

( * ) Notice: Subject to any disclaimer, the term of this patent is extended or adjusted under 35 U.S.C. 154(b) by 774 days.

(21) Appl. No.: 10/381,940

(22) PCT Filed: Sep. 28, 2001

(86) PCT No.: PCT/FI01/00843

§ 371 (c)(1),
(2), (4) Date: Jul. 10, 2003

(87) PCT Pub. No.: WO02/27674

PCT Pub. Date: Apr. 4, 2002

(65) Prior Publication Data

US 2004/0015442 A1 Jan. 22, 2004

(30) Foreign Application Priority Data

Sep. 29, 2000 (FI) ................................. 20002146

(51) Int. Cl.
*G06F 19/00* (2006.01)
*H04L 9/00* (2006.01)

(52) U.S. Cl. ...................... 713/178; 463/29; 380/251

(58) Field of Classification Search ................. 713/178; 463/12–13, 16–18, 29, 43, 53, 59
See application file for complete search history.

(56) References Cited

U.S. PATENT DOCUMENTS 5,189,700 A * 2/1993 Blandford ................... 713/178

(Continued)

FOREIGN PATENT DOCUMENTS

FI 981212 10/1998

(Continued)

OTHER PUBLICATIONS

"Remote Electronic Gambling," by C. Hall and B. Schneier, IEEE, Dec. 1997, pp. 232-238.

(Continued)

*Primary Examiner*—Gilberto Barron, Jr.
*Assistant Examiner*—Venkat Perungavoor
(74) *Attorney, Agent, or Firm*—K & L Gates LLP

(57) ABSTRACT

Methods and arrangements are provided for handling, within a communications system comprising a distributed domain (301) and a central domain (303), electronic records that contain predictions of the outcome of a certain incident. Within the distributed domain (301), a multitude of electronic records are generated that contain predictions of the outcome of the incident and are conveyed (305) from the distributed domain (301) to the central domain (303). Each of the electronic records is furnished (304, 401, 502, 902, 1202, 1911), within the distributed domain (301), with a cryptographically protected proof of a certain moment of time associated with the generation of the electronic record. The central domain (303) accepts (306, 1430, 2011) only those of the electronic records conveyed thereto as valid for which the cryptographically protected proof of a certain moment of time associated with the generation of the electronic record shows that said certain moment of time was not later in time than a certain time limit.

66 Claims, 15 Drawing Sheets

U.S. PATENT DOCUMENTS

| | | | |
|---|---|---|---|
| 5,524,052 A * | 6/1996 | Augustine et al. | 713/150 |
| 5,761,309 A * | 6/1998 | Ohashi et al. | 713/156 |
| 5,781,630 A | 7/1998 | Huber et al. | |
| 5,830,068 A | 11/1998 | Brenner et al. | |
| 5,871,398 A | 2/1999 | Schneier et al. | |
| 5,956,404 A | 9/1999 | Schneier et al. | |
| 6,470,449 B1 * | 10/2002 | Blandford | 713/178 |

FOREIGN PATENT DOCUMENTS

| | | |
|---|---|---|
| FR | 2693120 | 1/1994 |
| GB | 2287342 | 9/1995 |
| JP | 10283422 | 10/1998 |
| WO | 0022908 | 4/2000 |

OTHER PUBLICATIONS

"How to Time-Stamp a Digital Document," by S. Haber and W. Stornetta, Journal of Cryptography, vol. 3, No. 2, 1991, pp. 99-111.

"Automatic Event-Stream Notarization Using Digital Signatures," by B. Schneier and J. Kelsey, Security Protocols: International Workshop, Apr. 1996, Proceedings, Springer-Verlag 1997, pp. 155-169.

* cited by examiner

METHODS AND ARRANGEMENTS FOR REALISING BETTING WITH OFF-LINE TERMINALS

CROSS REFERENCE TO RELATED APPLICATIONS

This application is for entry into the U.S. national phase under §371 for International Application No. PCT/FI01/00843 having an international filing date of Sep. 28, 2001, and from which priority is claimed under all applicable sections of Title 35 of the United States Code including, but not limited to, Sections 120, 363 and 365(c), and which in turn claims priority under 35 USC §119 to Finnish Patent Application No. 20002146 filed on Sep. 29, 2000.

TECHNICAL FIELD

The invention concerns generally the technological field of betting and/or gambling with the help of electronic communications systems. Especially the invention concerns the use of off-line terminals to play a game where the actions of the players must be accomplished according to a certain timetable.

BACKGROUND OF THE INVENTION

Betting can be generally defined as an activity where a number of participants try to predict the outcome of a certain well-defined incident, such as e.g. a sports event, an election or simply the arbitrary drawing of a small group of numbers or other symbols (in the latter case the terms "lotto" or "lottery" are more commonly used than "betting"). Typically placing a bet means putting down a certain sum of money or other commodity of value, so that those who succeeded in predicting the outcome of the incident in question get their investment back with a certain profit that is financed from the collected stakes of the unsuccessful participants. An important feature of betting is that all bets must be placed before a certain time instant after which it would be possible to know the result or anticipate it with an increased level of certainty.

In a manual betting system where all bets must be placed before an officer of the organiser of the game it is easy to take care of the timing aspects of betting. The counter which accepts the bets closes at the moment after which no more bets are accepted, and opens again for paying the profits after the outcome of the incident is known. In electronic betting arrangements the situation is somewhat more complicated.

FIG. 1 illustrates a known system for so-called online betting where bets can be placed basically anywhere where a suitable communication connection exists. The system comprises a number of betting terminals, of which 101, 102, and 103 are shown. A communications network 104 links the terminals to the premises 105 of the organiser of the game. A central database 106 is provided there for storing the bets. A hot backup database 107 duplicates all operations made in the main database 106, and a cold backup database 108 is ready to replace any of the main or hot backup databases in a case of a detected failure. The purpose of using at least one backup database is to ensure that the probability of losing information due to an eventual failure in the main database is sufficiently low. Schematically shown in FIG. 1 as 109 are means for figuratively cutting the connection between the database 106 and the network 104 as a response to a certain clock signal.

In the system of FIG. 1 there is, in addition to the players and the organiser, also a third party 110, which is typically a governmental supervisory body. The third party has its own database 111 for storing yet another backup copy of the betting information or at least some summarising information thereof. A communications connection 112 links the third party's database 111 to the main database 106 of the organiser. The communications connection 112 could also go through the communications network 104. The task of the third party is to enhance the players' confidence to the game by ensuring that the organiser does not modify the bets after they have been placed.

The operation of the system of FIG. 1 is illustrated in FIG. 2. At step 201 a player places a bet at one of the terminals. The terminal transmits the bet in electronic form 202 through the communications network to the main database, where it is received and stored at step 203. The main database acknowledges the reception and storing of the bet by transmitting an acknowledgement message 204 to the terminal. The hot backup database stores copies of the bet and the acknowledgement message at step 205 at the latest; duplication to the hot backup database may also take place immediately after each single receive, store and/or transmit operation occurring in the main database. As a proof of the placed bet the terminal prints a receipt 206 to the user. The steps 203, 204, 205 and 206 constitute a so-called transaction: they must all succeed or all fail together. Otherwise the system might end up in a state where there exist different conceptions of who has or may have obligations to whom.

After a certain moment of time, which in FIG. 2 is designated as 207, no more bets are accepted, meaning that all eventual later attempts of transmitting bets from the terminals to the main database would be turned down by the latter. In the arrangement of FIG. 1 this means that the cutting means 109 are used to isolate the main database from the connections to the terminals. At step 208 the main database composes a summary of all legally placed bets, which it transmits at step 209 to the third party's backup database. After that the actual incident that was the object of betting may begin at step 210.

After a later time instant 211 when the outcome of the incident has become known, the winning players may collect their profits. At step 212 the player of FIG. 2 presents his receipt to the terminal. At step 213 the terminal transmits to the main database a request for an authorisation for paying out the profit. The main database must ensure that no profit is paid out more than once, so at step 214 it marks the bet for which the request was made as paid. At step 215 it transmits the authorisation message to the terminal. Copies of the request and authorisation messages are stored into the hot backup database at step 216. After having received the authorisation the terminal pays the profit to the player at step 217. Steps 214, 215, 216 and 217 constitute again a transaction.

The use of electronic money and electronically maintained accounts may cause some changes to the system of FIG. 1 and the method of FIG. 2. In one alternative embodiment of known electronic betting the organiser maintains, together with the databases described above, a player database where each player has a playing account. In that case the player does not need to pay his bets at the terminal: he only instructs the organiser to deduct the price of his bet(s) from his account. After the incident the organiser may automatically credit the accounts of those players the bets of which entitled them to profits.

A feature common to all known electronic betting systems is their relative slowness in receiving the bets. Large betting systems must accept even tens of millions of bets concerning a single incident. Even when very fast communications and storage technology are used, there exists a limit for the rate at which the bets can be communicated and stored into the central database. This feature has limited the applicability of the whole principle of betting to incidents which are objects of betting that are themselves rather large and long lasting, like a complete football game or a complete horse race. With the prior art arrangements of the above-described kind it is not possible to realise for example a situation where, in the middle of football world cup finals, the result of a corner kick would suddenly be declared an object of betting. In that case all bets should be placed during the 15 seconds or so that it takes from the referee's whistle to the moment when the player's foot hits the ball at the corner flag.

SUMMARY OF THE INVENTION

It is an object of the present invention to present a method and an arrangement for arranging electronic betting with potentially very short time cycles. It is another object of the invention to present a method and an arrangement for electronic betting with good scalability into very small and very large groups of potential players. It is yet another object of the invention to present a method and an arrangement for electronic betting with reasonable requirements concerning dedicated hardware.

The objects of the invention are achieved by using offline terminals for betting so that a secure clock signal is used to label a bet before it reaches a central database.

The method applies to a method for handling, within a communications system comprising a distributed domain and a central domain, electronic records that contain predictions of the outcome of a certain incident, comprising the steps of:
 generating, within the distributed domain and before the outcome of the incident is known, a multitude of electronic records that contain predictions of the outcome of the incident,
 conveying the electronic records from the distributed domain to the central domain and
 within the central domain and after the outcome of the incident is known, determining which of the electronic records, if any, contain correct predictions of the outcome of the incident. It is characteristic to the method that it comprises the steps of:
 furnishing, within the distributed domain, each of the electronic records with a cryptographically protected proof of a certain moment of time associated with the generation of the electronic record and
 accepting, within the central domain, only those of the electronic records conveyed thereto as valid for which the cryptographically protected proof of a certain moment of time associated with the generation of the electronic record shows that said certain moment of time was not later in time than a certain time limit.

The invention applies also to a method for handling, within a terminal arrangement that belongs to the distributed domain of communications system comprising a distributed domain and a central domain, electronic records that contain predictions of the outcome of a certain incident, the method comprising the steps of:
 generating an electronic record that contains a prediction of the outcome of the incident and
 transmitting the electronic record to the central domain. This embodiment of the invention is characterised in that it comprises the step of:
 furnishing the electronic record, before transmitting it to the central domain, with a cryptographically protected proof of a certain moment of time associated with the generation of the electronic record.

The invention applies also to a method for handling, within a computer system that belongs to the central domain of a communications system comprising a distributed domain and a central domain, electronic records that contain predictions of the outcome of a certain incident, the method comprising the steps of:
 receiving from the distributed domain a multitude of electronic records that contain predictions of the outcome of the incident and
 after the outcome of the incident is known, finding out which of the electronic records, if any, contain correct predictions of the outcome of the incident. This embodiment of the invention is characterised in that it comprises the step of:
 accepting only those of the electronic records received from the distributed domain as valid for which a cryptographically protected proof of a certain moment of time associated with the generation of the electronic record shows that said certain moment of time was not later in time than a certain time limit.

The invention applies also to a terminal arrangement for handling electronic records that contain predictions of the outcome of a certain incident, comprising:
 bet record generation means for generating an electronic record that contains a prediction of the outcome of the incident and
 transmitter means for transmitting the electronic record to a central domain. It is characterised in that it comprises:
 means for furnishing the electronic record, before transmitting it to the central domain, with a cryptographically protected proof of a certain moment of time associated with the generation of the electronic record.

The invention applies also to a computer system for handling, within the central domain of a communications system comprising a distributed domain and a central domain, electronic records that contain predictions of the outcome of a certain incident, comprising:
 receiver means for receiving from the distributed domain a multitude of electronic records that contain predictions of the outcome of the incident and
 processing means for finding out, after the outcome of the incident is known, which of the electronic records, if any, contain correct predictions of the outcome of the incident. It is characterised in that it comprises:
 discriminating means for accepting only those of the electronic records received from the distributed domain as valid for which a cryptographically protected proof of a certain moment of time associated with the generation of the electronic record shows that said certain moment of time was not later in time than a certain time limit.

Additionally the invention applies to an arrangement for handling, within a communications system comprising a distributed domain and a central domain, electronic records that contain predictions of the outcome of a certain incident, comprising:
 within the distributed domain means for generating, before the outcome of the incident is known, a multitude of electronic records that contain predictions of the outcome of the incident,
 means for conveying the electronic records from the distributed domain to the central domain and
 within the central domain means for finding out, after the outcome of the incident is known, which of the electronic records, if any, contain correct predictions of the outcome of the incident. It is characterised in that it comprises:
 within the distributed domain means for furnishing each of the electronic records with a cryptographically protected proof of a certain moment of time associated with the generation of the electronic record and within the central domain means for accepting only those of the electronic records conveyed thereto as valid for which the cryptographically protected proof of a certain moment of time associated with the generation of the electronic record shows that said certain moment of time was not later in time than a certain time limit.

The prior art requirement for using a central database as the storage location of the decisive copy of each bet record arises from the need for preventing cheats: It must be ensured that a dishonest participant cannot wait until some moment after the official closing time, use his acquired knowledge about the outcome that was the object of betting, and place a bet that would still appear to have come in time. According to the invention there is provided a different way of coupling each bet with the exact moment of time at which it was made, or more accurately coupling the bet with the knowledge that the bet was made before a certain time instant. Betting terminals, or at least some distributed data processing entities that are not located at any central database, are arranged to compose bet records that are self-sustaining in the sense that each bet record as such can be later decoded to reveal both the placer and content of the bet and whether or not the bet was made in time. In this patent application we will refer to such bet records as time-stamped bet records.

The implementation of time-stamping means usually that the device which performs the time-stamping is equipped with a clock and means for converting certain information given by the clock into an encrypted message from which it is impossible for unauthorized parties to deduce the conversion algorithm. Alternatively the clock signal may come from some other device than the device that performs the actual time-stamping. Most advantageously the clock signal itself is encrypted, and/or the clock signal generator is located within a protected structure that prevents dishonest users from tampering with the clock. It is also possible to use a terminal for composing the bet record and another device to time-stamp it.

The principle of generating the self-sustaining bet records "locally", i.e. outside the central database, does not place any limitations to the number or rate of placing bets. After the bet records have been generated there is a certain time during which they must be communicated into the system of the organiser of the game in order for them to be acknowledged. The organiser's system decodes each bet record, checks the time stamps and accepts only those bet records for which the time stamp shows that the bet was made in time. Those players are credited the accepted bets of which matched the actual outcome of the incident. Additionally each accepted bet causes the organiser's system to deduct the stake, i.e. the price of the bet, from the account of the player who placed the bet.

The procedure of locally generating bet records and communicating them into a central database requires the betting terminal to have some data processing and communicational capabilities. These requirements together with the object of keeping the need of dedicated hardware at a reasonable level suggest that the terminals of known two-way communications systems could be used as betting terminals. Indeed, many known communications systems such as cellular radio networks and bidirectional digital television networks offer very advantageous possibilities to the application of the invention. These networks enable rapid general broadcastings in the downlink or forward direction to large numbers of terminals, as well as collection of relatively short messages in the uplink or reverse direction from large numbers of terminals to a central location during a longer time. The terminals of the existing communications networks are already a part of the everyday life of potential users of the betting arrangement of the invention, which smoothens the way from the abstract idea of the invention into practical applications. The terminals even already possess some features of user- and/or network controlled programmability, which makes it easy to distribute the software components required in the terminals to those users that want to use their terminals as betting terminals of the arrangement according to the invention.

BRIEF DESCRIPTION OF THE DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION

Figure 1:
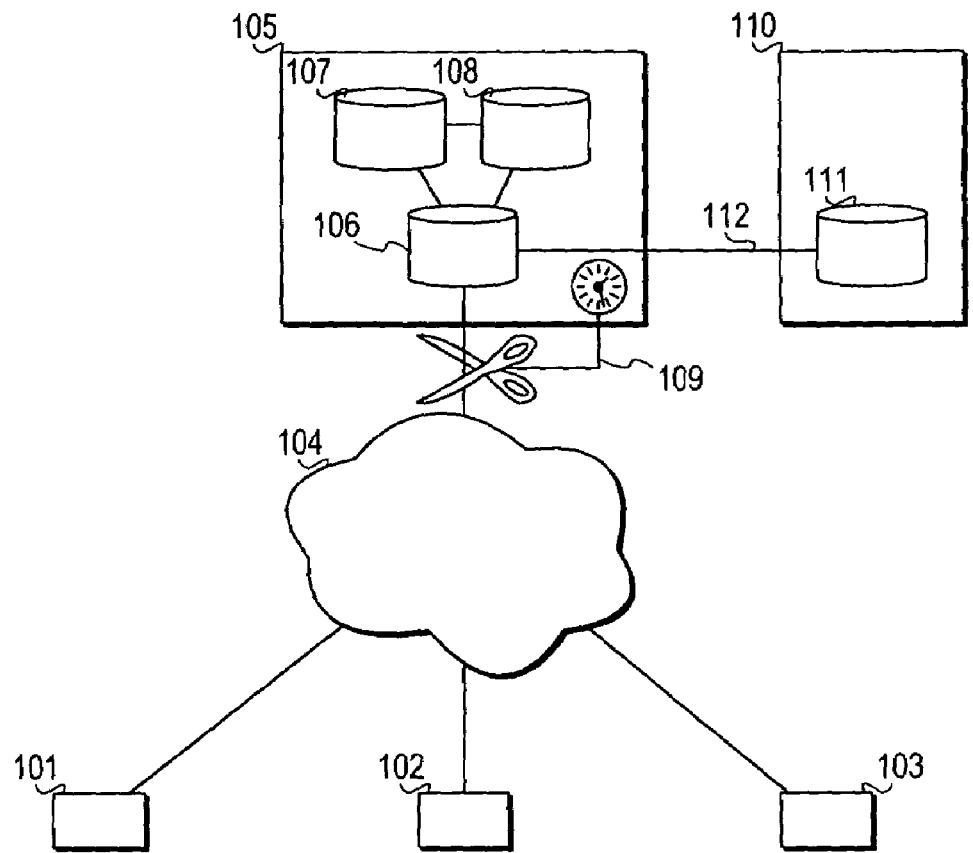
FIG. 1 illustrates a known arrangement for electronic betting.
Figure 2:
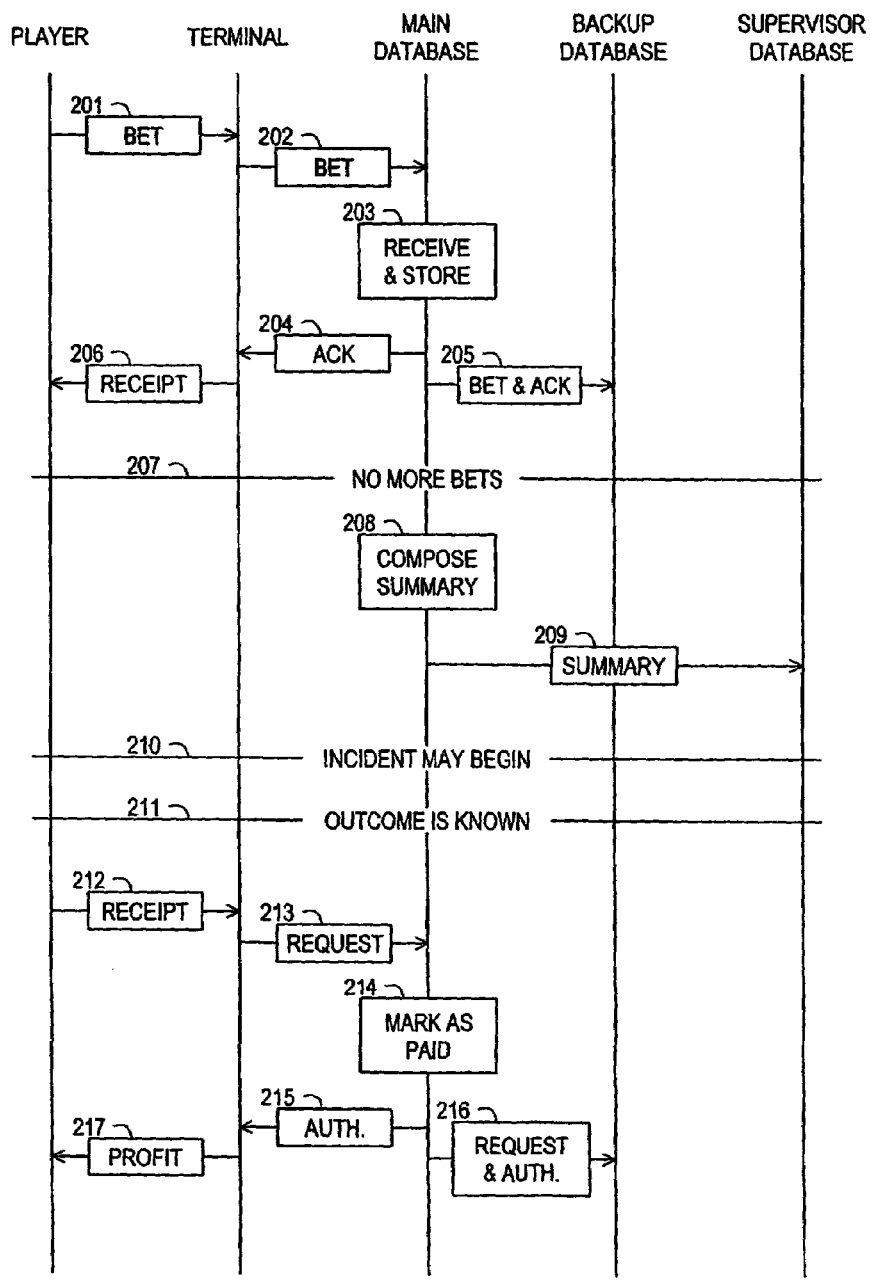
FIG. 2 illustrates a known method for electronic betting.

FIGS. 1 and 2 were described in the description of prior art, so the following description of the invention and its advantageous embodiments focuses on FIGS. 3 to 20. Like parts in the drawings are designated with the same reference designators.

Figure 3:
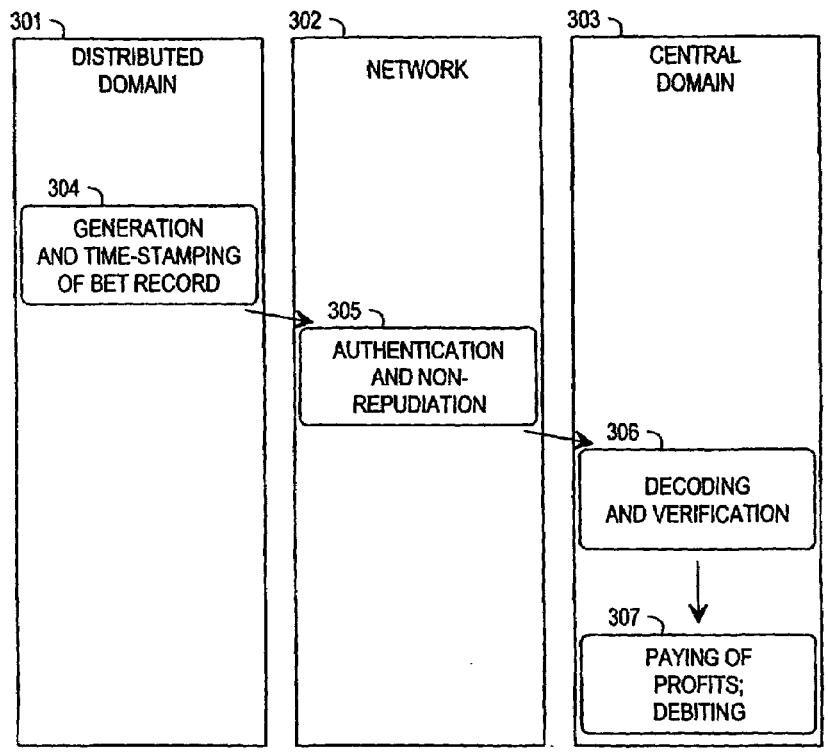
FIG. 3 illustrates a principle of off-line electronic betting.

FIG. 3 illustrates a principle where the parties that take part in the betting are divided into a distributed domain 301, a network 302 and a central domain 303. We assume that a game of betting involves a large number of participants as well as an organiser who runs the game, i.e. collects the bets, calculates the profits according to the outcome of the incident which was the object of betting, and arranges the distribution of stakes so that the winning players can collect their profits and the losing players lose their stakes. The players as well as the (advantageously personal) electronic terminals they use for taking part in the betting belong clearly to the distributed domain 301. The computerized system that the organiser uses to manage his part of the procedure belongs to the central domain 303. The task of the network 302 is to act as a channel of information exchange between the distributed domain 301 and the central domain 303. Actually the "network" concept reaches both to the distributed domain 301 and to the central domain 303, because each terminal that is used for betting constitutes a terminal node in the network, and the system of the organiser constitutes a central node in the network. Due to the large number of terminals and the small number of organiser's system nodes, the network 302 resembles a tree-like structure where the root of the tree is at the organiser's system node(s) and numerous branches are directed therefrom towards the players' terminals.

According to the principle of off-line electronic betting, the generation of bet records within the distributed domain 301 involves the additional feature of time-stamping each bet record so that at any later time instant it is possible to determine, by looking at the bet record, whether or not the bet record was produced before a certain instant of time and whether or not the bet record has been modified after its generation. The generation and time-stamping of bet records is generally designated in FIG. 3 as step 304. When such a bet record is transmitted towards the central domain 303, it is the task of the network 302 to provide means for both authentication and non-repudiation of the time-stamped bet record. Authentication means in this context that the true identity of both the original transmitter and the final receiver are known. Non-repudiation means that the original transmitter of the time-stamped bet record cannot later deny having transmitted the record. Other important security features which the network 302 should advantageously provide are integrity and confidentiality, meaning that the contents of the time-stamped bet record are not modified in transit and that unauthorised parties are prevented from detecting, who sent what to whom. The transmission of the time-stamped bet record through the network is generally designated in FIG. 3 as step 305.

The system of the organiser, located within the central domain 303, must receive, decode and verify the time-stamped bet record at step 306. The difference between online and off-line electronic betting is that in the latter, step 306 can take place at any time before or after the closing time (the moment after which the outcome of the incident is either known or possible to anticipate with an increased level of certainty). In FIG. 3, the system of the organiser checks the time stamp of each received bet record and accepts only those bet records into the game in which the time stamp reveals that the bet record was generated before the closing time. Additionally the system of the organiser checks at step 306 that the bet record came from its authenticated transmitter and that the contents thereof were not modified after its generation. After the outcome of the incident which was the object of betting is known, the system of the organiser converts at step 307 those bets which succeeded in anticipating the outcome into payment orders that credit the winning players. Additionally the system of the organiser deducts the placed stakes from the accounts of the players who placed bets. The last-mentioned step emphasises the importance of non-repudiation: a player who placed a non-winning bet must not be able to withdraw his bet after the closing time.

The level of security against cheating that is to be reached is typically in proportion to the value of obtainable prizes. In a recreational game or form of entertainment for children, where no monetary value is involved, little or no security measures are needed since the number of players is supposedly small and the organiser may expect everybody to play along the rules. If and when the invention is applied for gambling, i.e. applications where money or other commodities of value can be obtained by placing successful bets, security must receive careful consideration. Different embodiments of the invention may be presented where different numbers of security measures are introduced.

In a maximum-security embodiment we must assume that even if a dishonest user is able to completely disassemble a terminal arrangement and break the codes that protect that part of the associated software that is stored within the terminal arrangement, security of the system must still not be endangered. This means that the successful execution of such operations by the terminal arrangement that are sensitive in the sense of system security must completely depend on information coming from outside the terminal arrangement. Some examples: if the terminal arrangement stores information in encrypted form, such cryptographic keys should be used which the terminal arrangement receives from somewhere else. If the terminal arrangement is to measure time, the measurement must at least indirectly depend on some external clock signal. If success or failure in a certain procedural step depends on some piece of information either definitely existing or definitely not existing in the terminal arrangement, the condition for using such information must come from outside the terminal arrangement.

In achieving maximal security it also helps if there exists a mechanism that enables the checking of integrity of data and program code as well as the correctness of local clock readings in the distributed domain. For example, the terminal arrangement may transmit encrypted reports of its status according to a given schedule. The terminal arrangement and/or the software running therein may also combine factors that describe the order and number of appeared incidents as well as their time of appearance. A broadcast type regular transmission from a trusted source may be used as an external clock that makes it unnecessary to generate local clock signals in environments sensitive to tampering. It is also advantageous to have the terminal itself implement a relatively low amount of encrypting and decrypting if reverse engineering of these operations would be of assistance in breaking a larger entity of security coding in the system.

Figure 4:
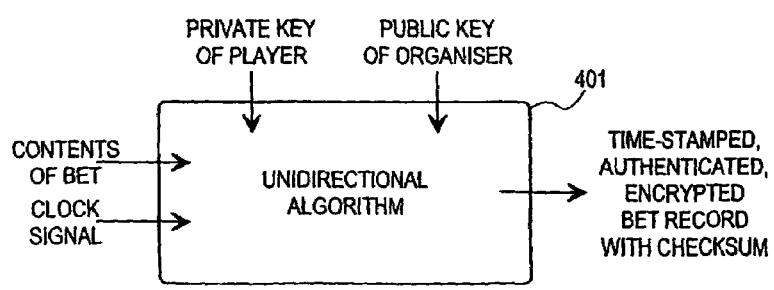
FIG. 4 illustrates the generation of a time-stamped bet record according to an embodiment of the invention.
Figure 5:
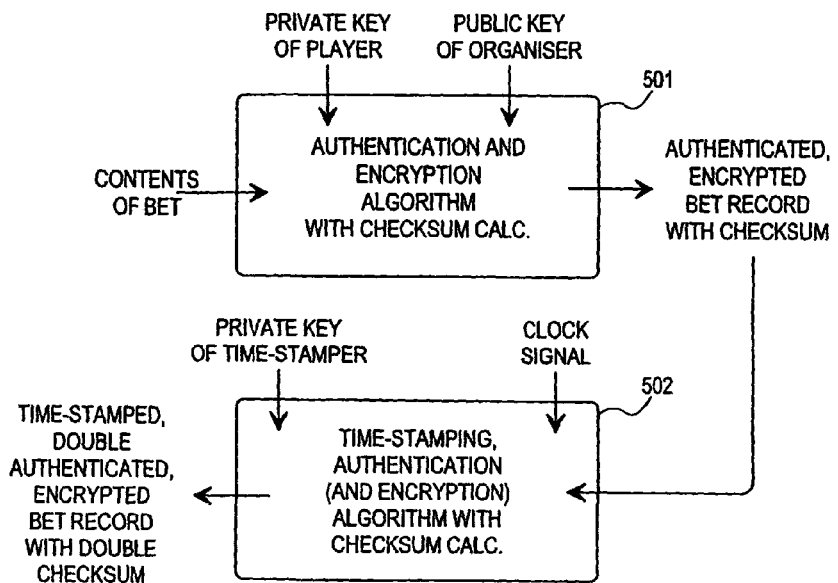
FIG. 5 illustrates the generation of a time-stamped bet record according to another embodiment of the invention.

FIGS. 4 and 5 illustrate certain possibilities of generating time-stamped bet records with appropriate features for authentication, non-repudiation, integrity and confidentiality considerations. From the field of digital cryptography there is known the concept of unidirectional algorithm, which means an algorithm which is easily performed into one direction in reasonable time but which is practically impossible to reverse without knowing a certain cryptographic key. In FIG. 4 a unidirectional algorithm 401 is used to convert the actual contents of the bet and a certain clock signal into a bet record that is authenticated by encrypting it with a private key of the player placing the bet and encrypted with the public key of the organiser. As a part of the conversion a checksum is calculated and added into the bet record. The result is an authenticated, encrypted and time-stamped bet record that can only be decrypted with the private key of the organiser. The authentication based on the player's private key can only be reversed with the same player's public key. Recalculating the checksum and comparing it against the checksum contained in the bet record serves as a check against later modifications.

FIG. 5 illustrates a similar principle of producing a secure time-stamped bet record with the difference that in FIG. 5 the procedures of generating the bet record and time-stamping it have been divided into two algorithms 501 and 502. These two algorithms may even be performed in two different devices so that the first device generates the bet record, calculates the checksum(s), authenticates the bet record with the player's private key and encrypts it with the organiser's public key. The time-stamping device does not need to know the contents of the encrypted bet record, i.e. it does not need to be able to decrypt it. It suffices that the time-stamper uses a clock signal to make a certain addition to the authenticated, encrypted bet record and re-authenticates it with its own private key. It may additionally re-encrypt the result with a public key of the organiser (the same public key as in algorithm 501 or some other), because for security reasons it is advantageous to always have an encryption operation as the last operation performed upon a message before transmitting it through an otherwise non-secure communications connection. The result given by the second algorithm 502 in FIG. 5 is a message from which the outer authentication can be checked with the public key of the time-stamper. Thereafter the time stamp may be checked. Additionally the inner authentication can be checked with the public key of the player, and all encryptions can be decrypted with the public key(s) of the organiser.

The principles of FIG. 3 and FIG. 5 leave it somewhat open as to where the time-stamping is actually performed. Next we will analyse certain possible system architectures where different ways and locations of time-stamping are considered.

Figure 6:
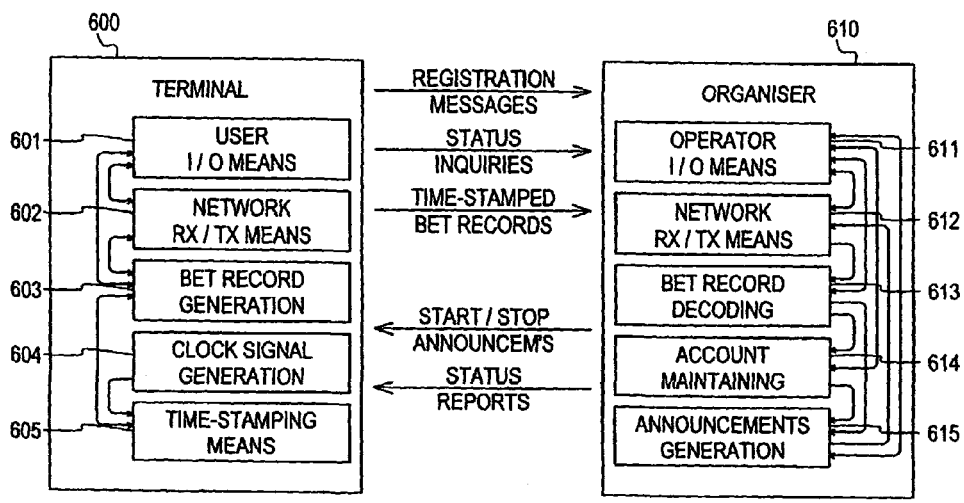
FIG. 6 illustrates the principle of a system where the main operations take place in a terminal and at the organiser's server.

FIG. 6 illustrates a system where the main operations that are relevant to off-line electronic betting are implemented in a terminal arrangement 600 and a server 610 operated by the organiser of the betting game. The terminal arrangement 600 comprises input/output means 601 for providing the user with outputs and for accepting inputs from the user. Additionally the terminal arrangement 600 comprises network transceiver means 602 for communicating with other devices through a certain network, which most advantageously is a long-distance network such as a cellular radio network, wired telephone network, packet-switched communications network between computers (like the Internet), a bidirectional cable television network or a combination of such networks. The terminal comprises also a bet record generation block 603 for generating, authenticating and encrypting checksum-protected bet records, a clock signal generating block 604 for locally generating clock signals, and a time-stamping block 605 for using the generated clock signals for time-stamping bet records. There is a connection from the clock signal generating block 604 to the time-stamping block 605 and between the time-stamping block 605 and the bet record generation block 603, as well as between the user input/output means 601 and both the network transceiver means 602 and the bet record generation block 603. Most advantageously there are no connections from the user input/output means 601 to either the clock signal generating block 604 or to the time-stamping block 605, because the user should not have any control over the time-stamping process.

The practical implementation of the blocks of the terminal 600 is straightforward. Most advantageously the terminal resembles the portable communications terminals known at the priority date of this patent application, so that the user input/output means 601 consist of a keypad and a display, the network transceiver means 602 comprise some transceiver means known from the technology of cellular radio systems and/or bidirectional cable television networks, and the bet record generation block 603, clock signal generating block 604 and the time-stamping block 605 are implemented as computer-controlled processes that are executed by a microprocessor or a number of microprocessors with eventually some additional components like voltage-controlled crystal oscillators.

The organiser's server 610 comprises a user input/output interface 611 for the operator who controls the betting on behalf of the organiser, and a network transceiver 612 that connects the server to the same network that was mentioned above. Additionally the organiser's server 610 comprises a bet record decoding block 613 the task of which is to perform all those functions that are needed to ensure the authenticity and integrity of a received bet record as well as to check from the time stamp that the bet was placed in time. An account maintaining block 614 is responsible for setting up and maintaining the user accounts so that for example profits are credited to the winning players' accounts and the placed stakes are deducted from the accounts of all participating players. An announcements generation block 615 is responsible for generating both the general broadcast announcements to all participating players and the personal messages that are only transmitted to individual players or small groups of players. The operator input/output interface 611 is bidirectionally connected to all other blocks in order to give the operator full control of the system. Other connections within the organiser's server comprise a chain of connections from the network transceiver 612 through the bet record decoding block 613 and the account maintaining block 614 to the announcements generation block 615 and back to the network transceiver 612, and a connection from the bet record decoding block 613 to the announcements generation block 615.

The operator's input/output interface 611 is most advantageously a keyboard and display interface. The network transceiver interface 612 may be any network interface available for coupling a heavy-duty network server to a communications network. The bet record decoding block 613, the account maintaining block 614 and the announcements generation block 615 are implemented as computer-controlled processes that are executed by a microprocessor or a number of microprocessors with eventually some additional components like voltage-controlled crystal oscillators.

In the system of FIG. 6, the terminal 600 is arranged to transmit in the uplink or reverse direction to the organiser's server 610 registration messages and status inquiries that are related to managing the way in which the player takes part in the betting. Additionally the terminal 600 transmits to the organiser's server 610 the actual time-stamped bet records. In the downlink or forward direction the organiser's server 610 transmits general broadcast messages which are mostly related -to the beginning and end moments of individual betting incidents, as well as status reports and other individualised information to individual terminals and/or small groups of terminals.

Figure 7:
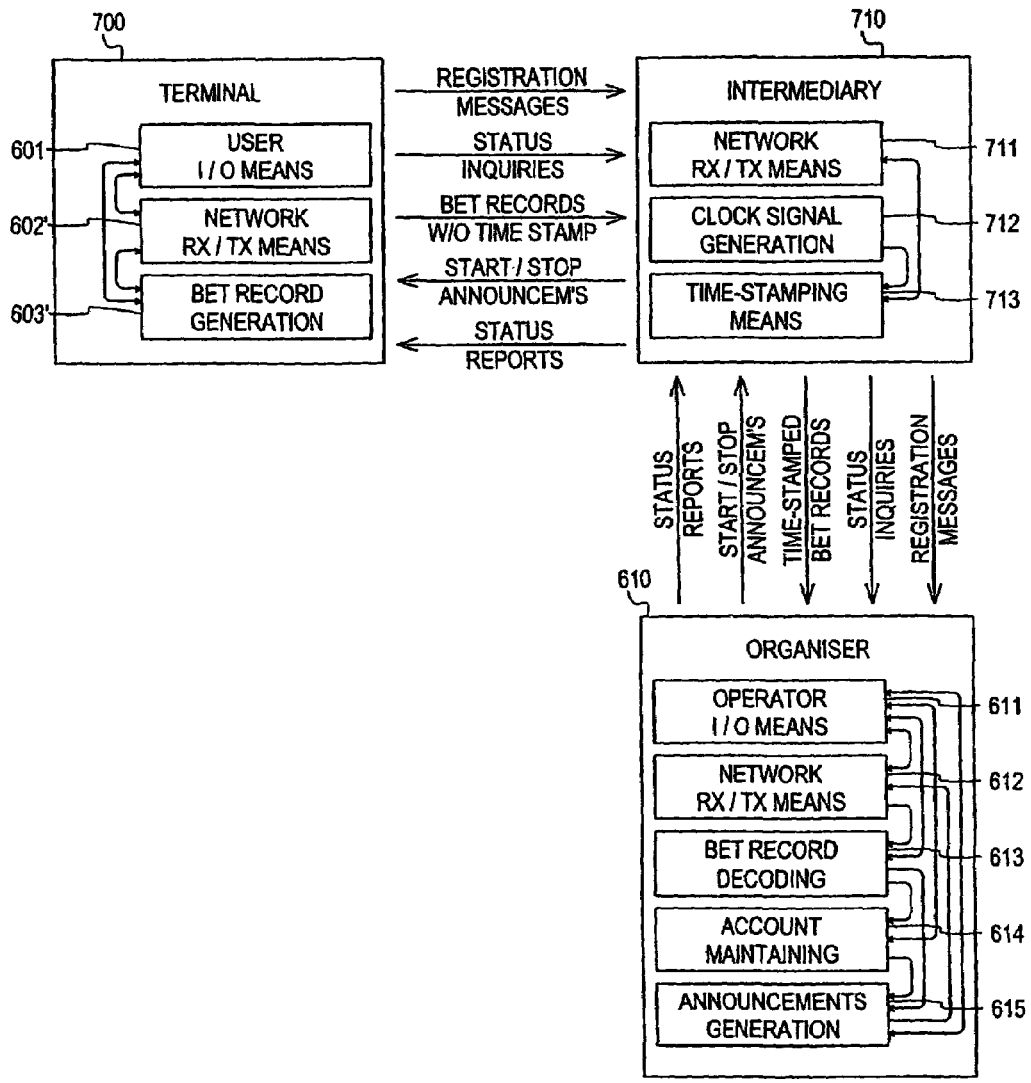
FIG. 7 illustrates a variation of the system of 6 where an intermediary time-stamper is used.

FIG. 7 illustrates an alternative arrangement where the task of time-stamping is entrusted to an intermediary device or link station 710 which conveys all exchange of information between a betting terminal 700 and the organiser's server 610. In this case the terminal 700 is simpler than the terminal 600 of FIG. 6: it only comprises the user input/output interface 601, the network transceiver interface 602' and a bet record generation block 603'. Primed reference designators are used because the network transceiver interface 602' and the bet record generation block 603' must fulfil slightly different operational requirements than in FIG. 6. For example, they must perform the tasks of generating, authenticating and potentially encrypting the bet records fast enough to that they make it to the intermediary device 710 before the closing time even when the user places his bet with a narrow time marginal left before the closing time. The intermediary device 710 comprises a network transceiver interface 711, a clock signal generation block 712 and time-stamping means 713 of which the latter is coupled to both other blocks so that a bet record received from a terminal may be taken through time-stamping before conveying it further to the organiser's server 610. The organiser's server 610 may as such be the same as in FIG. 6.

The principle of using an intermediary device 710 for the time-stamping has the inherent advantage that the users are under no circumstances able to tamper with the time-stamping procedure (as long as controlling access to the intermediary both physically and through the network is suitably restricted). It sacrifices some of the advantages of the terminal-based time stamping of FIG. 6 because the intermediary device must now withstand the potentially very heavy momentary load caused by a large number of users making their bets essentially simultaneously. According to the principle of off-line electronic betting the intermediary device 710 is well within the distributed domain 301 of FIG. 3, meaning that there are numerous intermediary devices which in the tree-like structure of the network that links the terminals to the central domain are on a rather low level, near the terminal nodes of the tree. This way it can be ensured that each individual intermediary device must only handle the bet records transmitted by a relatively small number of terminals. For example the base stations of cellular radio systems might act as such intermediary devices.

The task of conveying the time-stamped bet records from the intermediary devices further towards the organiser's server is not time-critical any more, because the time stamps serve as a proof of the bets having been placed in time even if the time-stamped bet records arrive only later to the organiser's server 610. In order to ease the processing load of the intermediary devices we may also define that only the bet records are conveyed through the intermediary devices and all other exchange of information between the terminal 700 and the organiser's server 610 bypass the intermediary device 710 altogether. The intermediary devices must comprise enough memory to temporarily store all such bet records which have been received from the terminals and time-stamped but which have not yet been communicated further to the central domain.

Figure 8A:
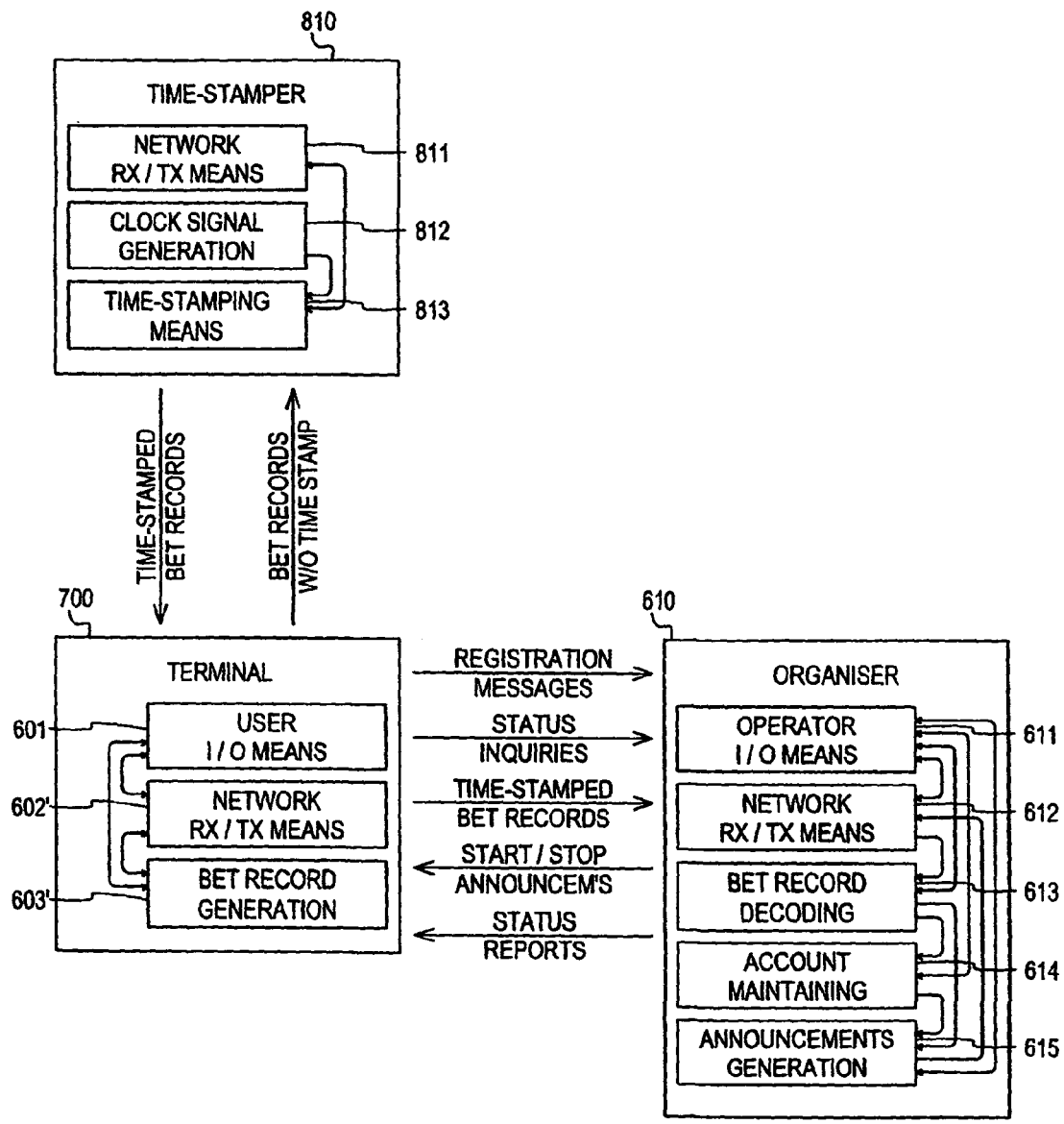
FIG. 8a illustrates a variation of the system of 6 where a distant auxiliary time-stamper is used.
Figure 8B:
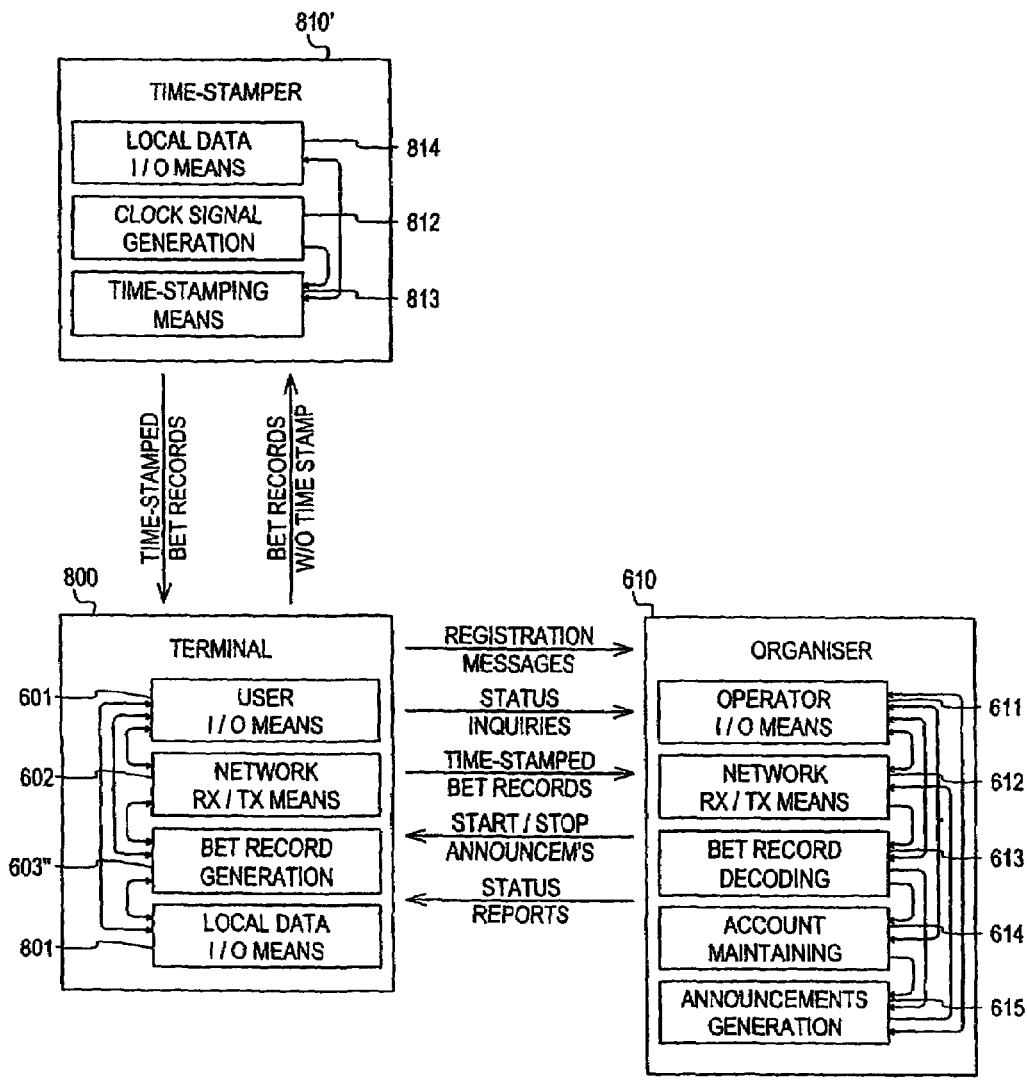
FIG. 8b illustrates a variation of the system of 6 where a local auxiliary time-stamper is used.

The principle of using a device auxiliary to the betting terminal for time-stamping can also be applied so that the terminal circulates the bet records through an auxiliary device before transmitting them to the organiser's server. FIGS. 8a and 8b illustrate arrangements that utilize this application of the principle. In FIG. 8a the organiser's server 610 remains still the same as in FIG. 6, and the terminal 700 is basically the same as in FIG. 7. However, the terminal is arranged both to transmit bet records without a time stamp through the network to a time-stamper 810 and to receive time-stamped bet record from the time-stamper and convey them further to the organiser's server 610. The time-stamper 810 has the same functional blocks as the intermediary device of FIG. 7 but it is only arranged to receive a bet record without a time stamp, perform the time-stamping and return the time-stamped bet record to the terminal which transmitted it, In FIG. 8b the principle is the same except for the fact that the interface between the terminal 800 and the time-stamper 810' is a local data input/output interface so that the same network which is used for communication between the terminal and the organiser's server is not used. Several local data interfaces are known and applicable to the purpose of local time-stamping according to FIG. 8b; such local data interfaces comprise but are not limited to the Bluetooth interface, the IrDA infrared interface, local data network interfaces of the Ethernet and Token Ring types and various wireless local loop interfaces. The time-stamper 810 belongs to the distributed domain, so a suitably large number of time-stampers must be provided in order to ensure that none of them is subjected to an excessive avalanche of simultaneously transmitted bet records.

Figure 9:
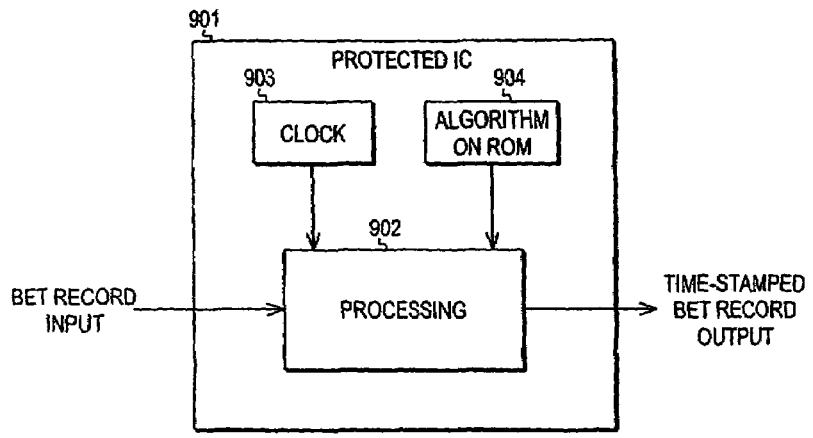
FIG. 9 illustrates an arrangement for implementing time-stamping with an internal source of a clock signal.

The embodiments of FIGS. 6 to 8b have the common feature of locally generating the clock signal for the purposes of time-stamping in the device which is responsible for the time-stamping. The question of making such a time-stamping process tamper-proof deserves some consideration. From the technology of protecting integrated circuits against unauthorised access there are known several ways of making it at least very difficult to affect or even find out the nature of processes performed within a circuit. An advantageous way of performing the time-stamping for example in the arrangement of FIG. 6 is such where both the generation of the clock signal and the actual time-stamping take place within a single protected integrated circuit. This is illustrated in FIG. 9 where the protected integrated circuit 901 comprises a processing block 902. The time-stamping means then that a bet record is input into the protected integrated circuit 901, and the output of a real time clock 903 located within the circuit is combined with the bet record by a cryptographic algorithm, which itself is also permanently stored in a read-only memory 904 within the protected integrated circuit 901. An unauthorised party does not know the algorithm and can not deduce it by analysing performed time-stampings due to its pseudorandom, cryptographic nature. The location of the clock signal source within the protected circuit prevents the unauthorised party from using a fake, delayed clock signal as an input to the time-stamping process.

Another relatively tamper-proof possibility of using a locally generated clock signal is to use such a clock signal for time-stamping, which is also used directly to synchronise certain critical operations of the terminal arrangement. For example, a terminal arrangement that acts as the terminal of a communications network must accomplish several tasks related to the physical level of communicating with the network in exact sychronism with the network. We may speak about the MAC (Media Access Control) functions that govern the terminal's ability of seizing a communications channel and using it successfully for communication. If we then assume that the clock signal used for time-stamping bet records is the same as some real time clock directly related to the MAC functions, we note that tampering with the clock signal would also change the behaviour of the terminal arrangement in the MAC context, which would make it impossible for the terminal arrangement to communicate any more with the network.

Figure 10:
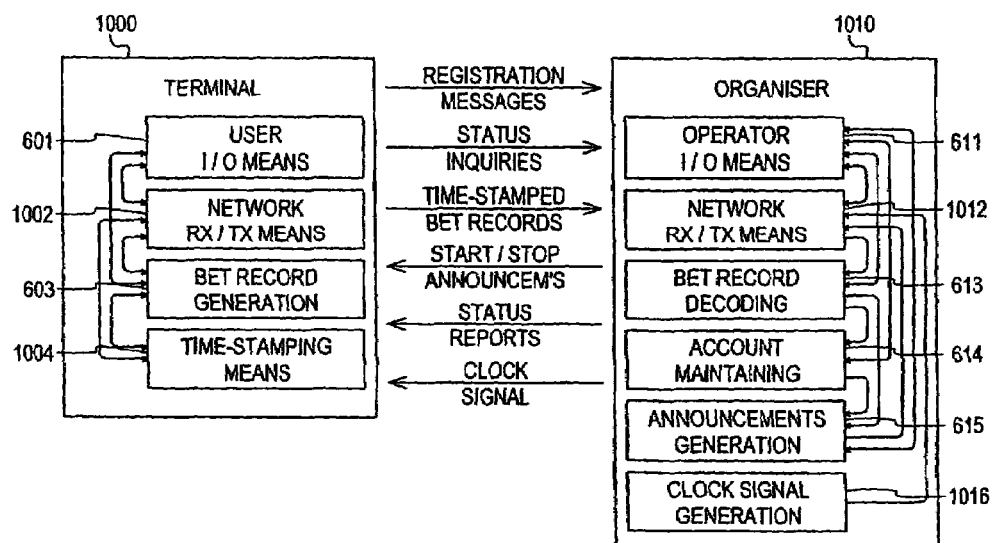
FIG. 10 illustrates a variation of the system of FIG. 6.

It is also possible to use such a clock signal as an input to the time-stamping process that is completely external to the device performing the time-stamping. FIG. 10 illustrates a system architecture where the parties essential to the application of offline electronic betting are a terminal 1000 and the organiser's server 1010. The terminal 1000 comprises a user input/output interface 601, a network transceiver interface 1002, a bet record generation block 603 and time-stamping means 1004. Of these the user input/output interface 601 and the bet record generation block 603 can be similar to the corresponding blocks in the system of FIG. 6. The network transceiver interface 1002 is arranged to receive not only the announcements and status reports from the organiser's server 1010 but also a clock signal, which is coupled into the timestamping means 1004 and used as an input for the timestamping process. The difference between the organiser's server 1010 in FIG. 10 and that 610 of FIG. 6 is that in FIG. 10 the organiser's server 1010 comprises a clock signal generation block 1016, and that the network transceiver interface 1012 of the organiser's server is arranged to multiplex the clock signal generated in block 1016 into the broadcastings which are directed to the terminals.

Figure 11:
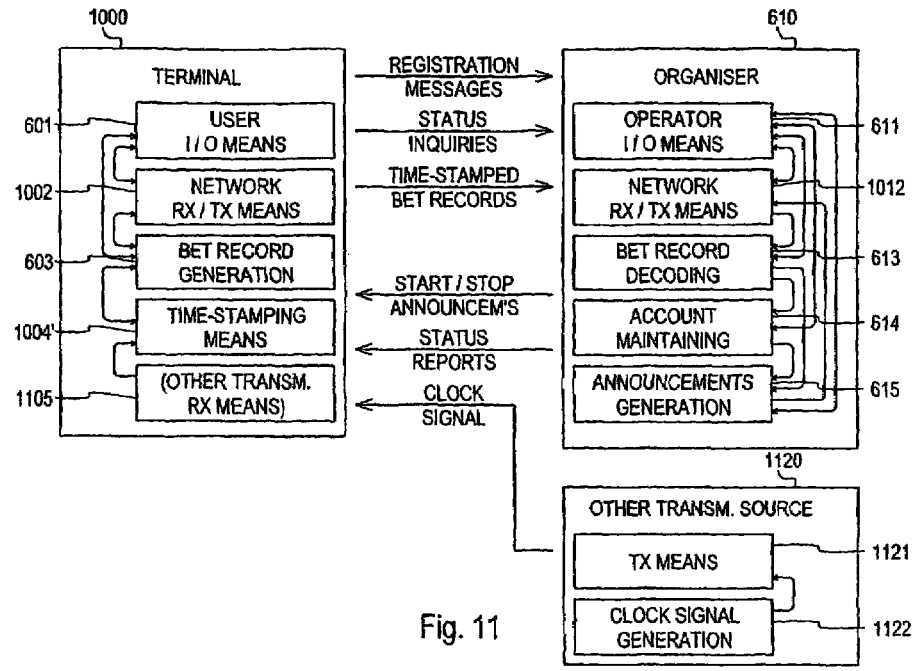
FIG. 11 illustrates another variation of the system of FIG. 6.

Typically the organiser's server is not broadcasting announcements continuously to the terminals, so the arrangement of FIG. 10 may be considered to have the drawback of requiring continuous or at least very frequent broadcastings in order to transmit the clock signal from block 1016 to the terminals frequently enough. FIG. 11 illustrates an alternative arrangement where the organiser's server 610 is the same as previously in FIG. 6, and the clock signal comes from some other transmission source 1120 which comprises a clock signal source 1122 and, coupled to its output, suitable transmission means 1121. The terminal 1000 is otherwise the same as in FIG. 10 but it may comprise the reception means 1105 required to receive the transmissions of the other transmission source 1120, if the transmissions therefrom can not be received through the same transceiver interface 1002 which the terminal uses for communicating with the organiser's terminal 610.

In order to take full advantage of the completely external clock transmission source 1120 it is advisable to select, as the clock transmission source 1120, a digital transmitter that would produce essentially constant general broadcastings anyway. Suitable transmission sources are then for example digital video and digital audio broadcasting stations as well as the base transceiver stations of such digital cellular radio systems that produce essentially continuous or at least very frequent downlink transmissions on a pilot channel or a general broadcast channel.

Figure 12:
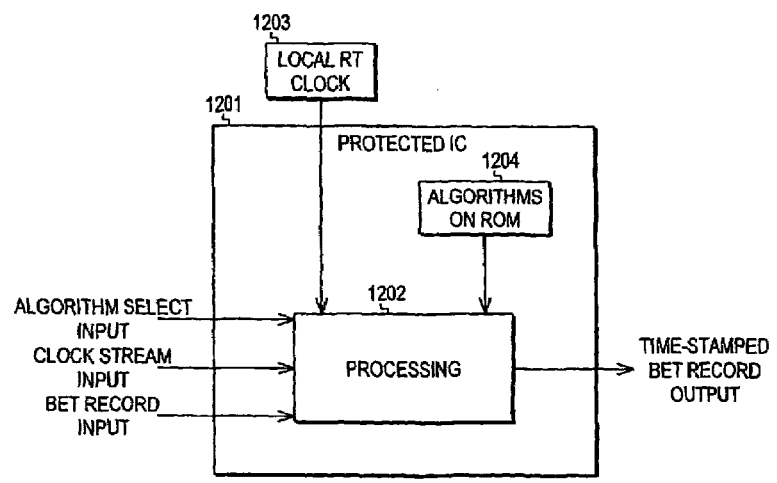
FIG. 12 illustrates an arrangement for implementing time-stamping with an external source of a clock signal.

Again it should be made as difficult as possible for a dishonest user to fake the clock signal, regardless of the fact that the clock signal now comes from outside of the betting terminal. An advantageous way of making it difficult to cheat is to keep it secret, what actually constitutes the clock signal. Basically an arbitrary combination of bits from an arbitrarily selected broadcast digital bit stream may be defined to constitute a clock signal. Such definition of the clock signal may even be disposable in the sense that one definition is only used for a limited duration of time, after which a new definition is announced. Additionally the terminal may be required to combine the received auxiliary clock signal to the output of a local real time clock with an algorithm which is unknown to the users, permanently stored on a protected integrated circuit which itself also performs the time-stamping, and even changed once in a while (a number of algorithms are permanently stored, so that changing means that a new one of them is selected). An example of an announcement of the clock signal to be used is then of the form: "For the next XXX seconds, use the bits X1 to XN from every Pth frame of a digital video broadcasting stream on frequency YYY as the clock signal, and combine them with the output of your local real-time clock through using algorithm Z" (here we assume that XXX, X1, XN, P and YYY are positive numerical values and Z is an identifier that identifies an algorithm). FIG. 12 illustrates a protected integrated circuit 1201 where a processing block 1202 receives as its inputs the bet record to be time-stamped, the digital bit stream that includes the clock signal in some non-public way, and the algorithm selection signal. Additionally the processing block 1202 may receive the output of a local real-time clock 1203. The algorithms are stored in an on-chip memory 1204.

Even if ultimate measures are taken to prevent dishonest users from tampering with their terminal arrangements, it may happen that someone manages to change the way in which his terminal arrangement operates so that it becomes possible to have the terminal arrangement produce and send to the network authentical-looking bet records that were generated after the closing time. As a preparatory measure that might uncover attempted cheating it is possible to make the terminal arrangements send regular or pseudorandom status messages to some monitoring apparatus that can be the same as the organiser's server or some completely other network-coupled device. A status message should preferably contain such information the correctness and integrity of which is impossible to retain if essential parts of the bet record generating and time-stamping operations are changed in the terminal arrangement. Such information may include, among others, checksums of passages of program code as well as snapshot type details like the reading of a clock that should represent local real time. The monitoring apparatus checks whether anything suspicious is found in the status messages, and reports any discrepancies found to the organiser's server.

One possible measure that can be taken against cheating is to require that a watchdog algorithm is constantly, regularly or pseudorandomly active in each terminal arrangement during the whole time that is relevant for generating and time-stamping bet records. The watchdog algorithm may itself be an encryption algorithm the execution of which is synchronised into a local hardware counter. Changing the output frequency of said counter must in that case disable an essential part of the terminal arrangement from functioning altogether; for example a frequency directly related to the MAC functions may be used as the hardware counter. It is also advantageous if the value of the hardware counter cannot be changed by software operations. The encryption-type watchdog algorithm requires a new cryptographic key to be supplied to it according to a predefined time schedule, so that a missing or wrong key interrupts the operation of the algorithm, which in turn makes it impossible to compose, time-stamp and/or transmit any more bet records. This is what it meant by the algorithm being a watchdog: if it is not functioning properly, the whole betting application or at least an essential part of it must fail in the terminal arrangement. The keys to the watchdog algorithm come most advantageously through transmissions from the network; they can come for example from the organiser's server but this it not a requirement of the invention.

Figure 13:
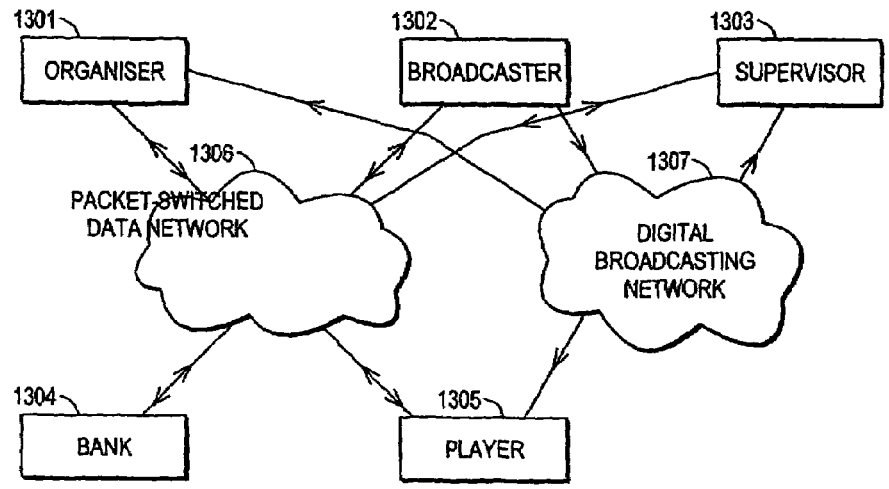
FIG. 13 illustrates a system architecture for an arrangement according to an embodiment of the invention.

We will now move on to describing one exemplary betting game as an example of applying the invention in practice. FIG. 13 illustrates the system architecture, where the parties involved are the organiser 1301 of the betting game, a broadcaster 1302 capable of producing widespread digital broadcastings, a governmental supervisory instance 1303, a bank 1304 supporting electronic money transactions and a player 1305. In a practical situation a very large number of players would be involved, but in order to describe the application of the present invention it suffices to describe the part of one player. Two communications networks are used, namely a packet-switched data network 1306 and a digital broadcasting network 1307. The system architecture corresponds mainly to that of FIG. 11.

The separation of the packet-switched data network 1306 and the digital broadcasting network 1307 from each other suggests that the former could be for example a wireless GPRS (General Packet Radio Services) network and the latter could be for example either a wireless or cable-based DAB (Digital Audio Broadcasting) or DVB (Digital Video Broadcasting) network. It is possible to use also other networks. As the packet-switched data network 1306 or instead of it one might consider using a more conventional cellular radio network where the messages could be transported in data calls and/or SMS (Short Messaging Services) messages, or a PSTN (Public Switched Telephone Network) with appropriate modem connections. It is also possible to unite the networks into e.g. a single bidirectional digital television network based on wireless and/or cable connections.

Figure 14A:
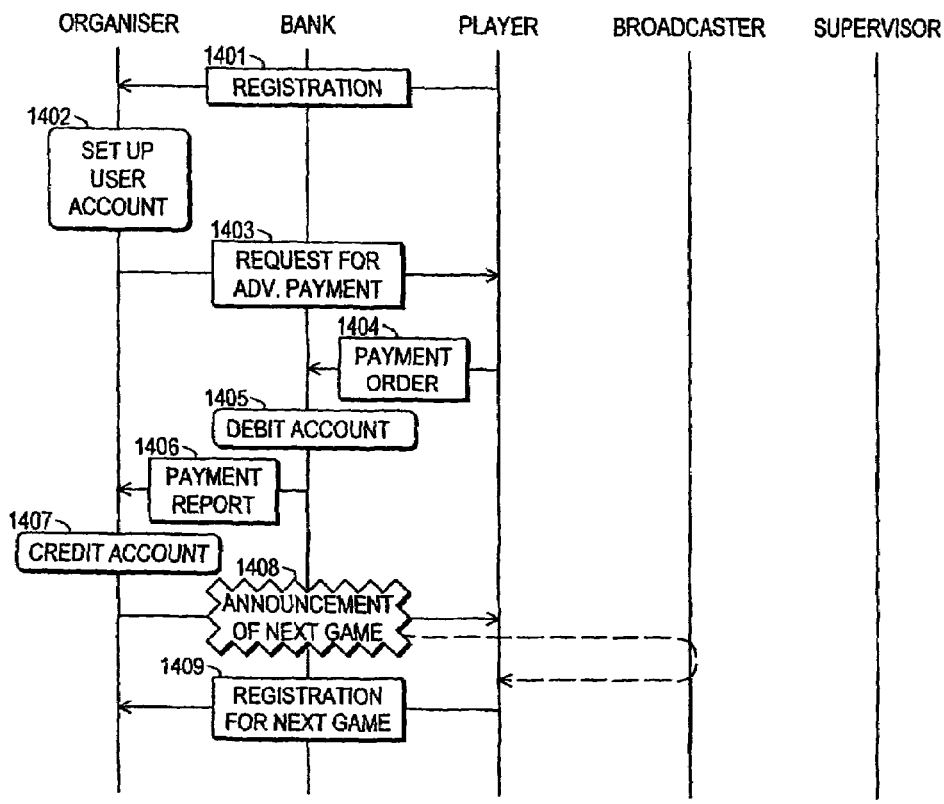
FIGS. 14a to 14c illustrate a method according to an embodiment of the invention.
Figure 14B:
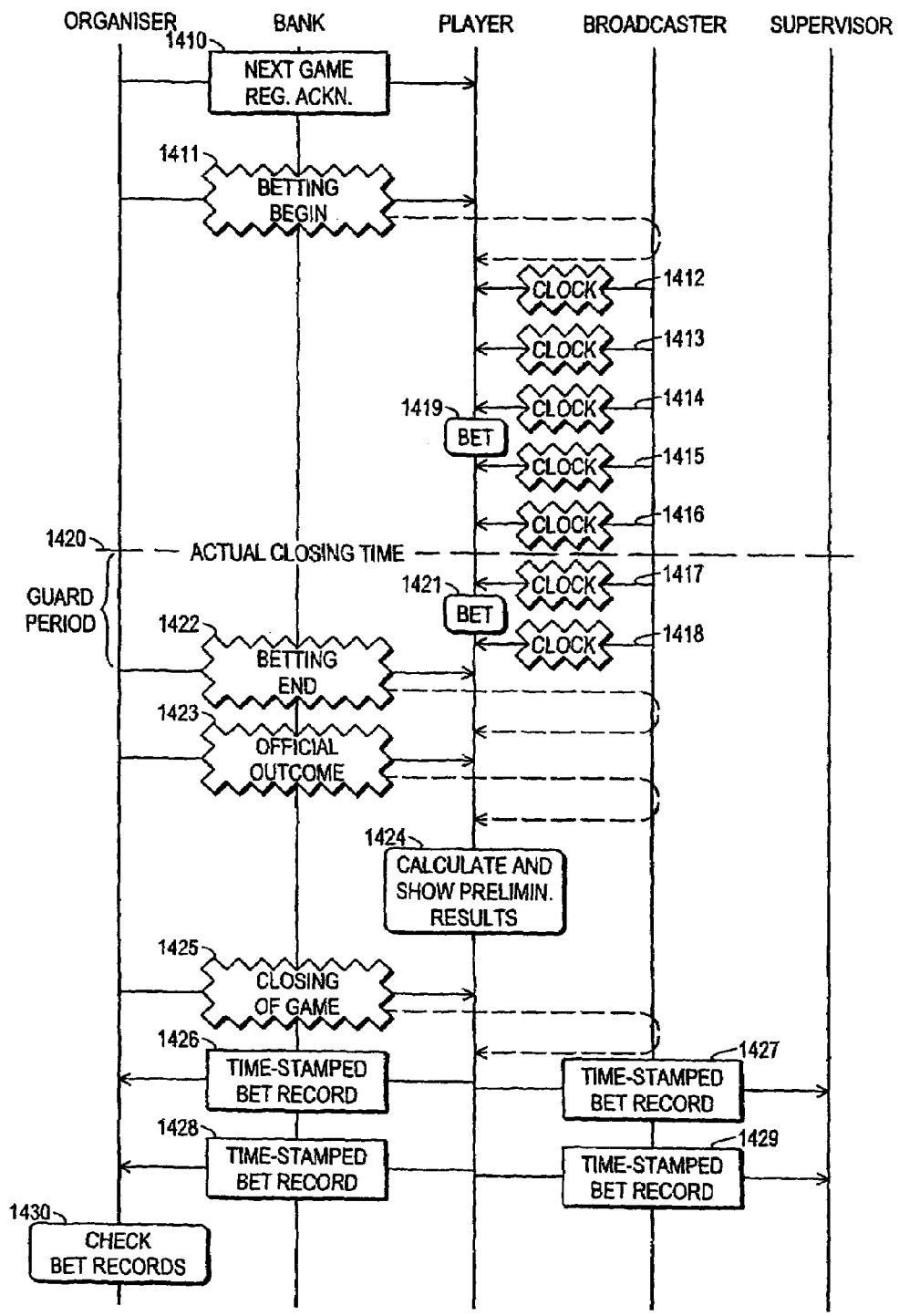
Figure 14C:
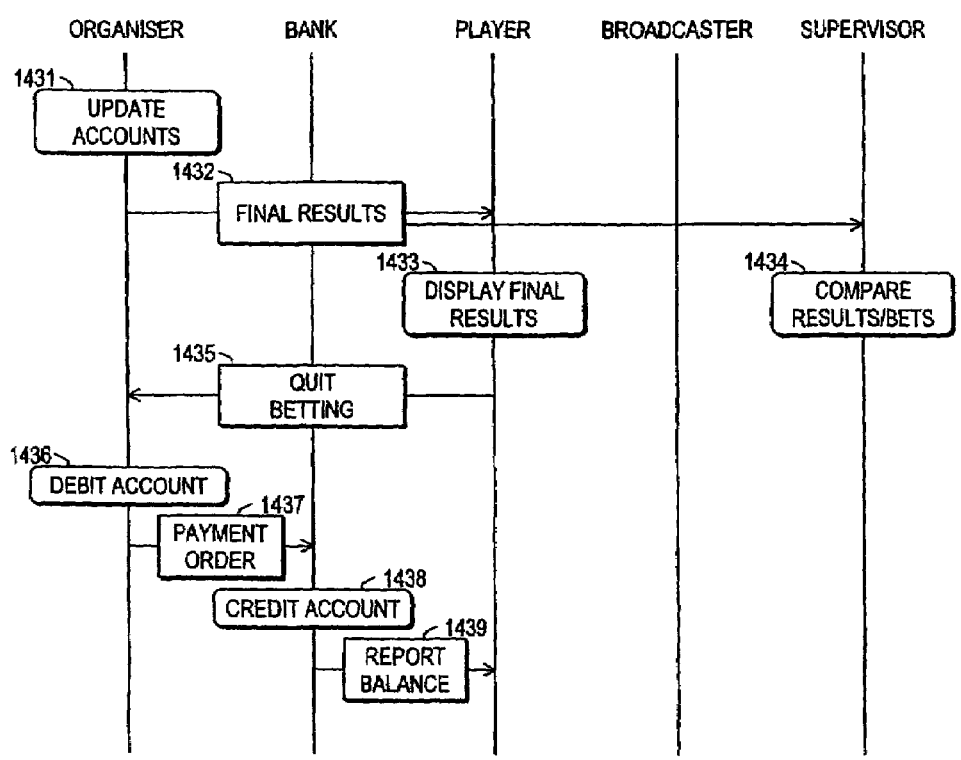
Figure 15:
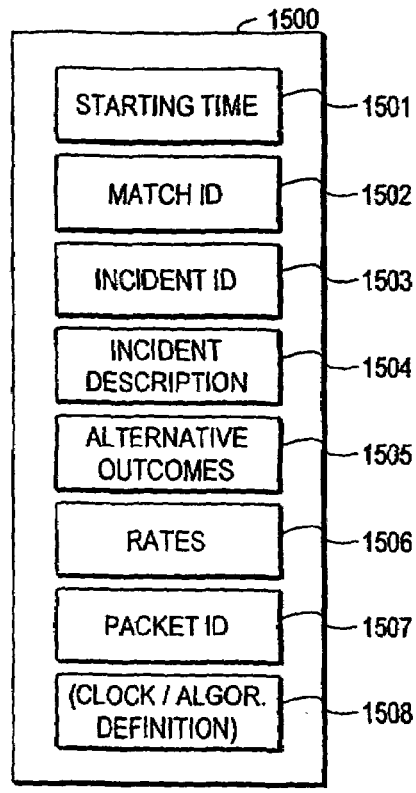
FIG. 15 illustrates an advantageous message structure used within the method of FIGS. 14a to 14c.
Figure 16:
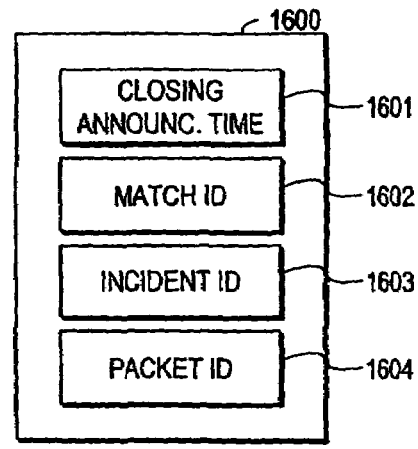
FIG. 16 illustrates another advantageous message structure used within the method of FIGS. 14a to 14c.
Figure 17:
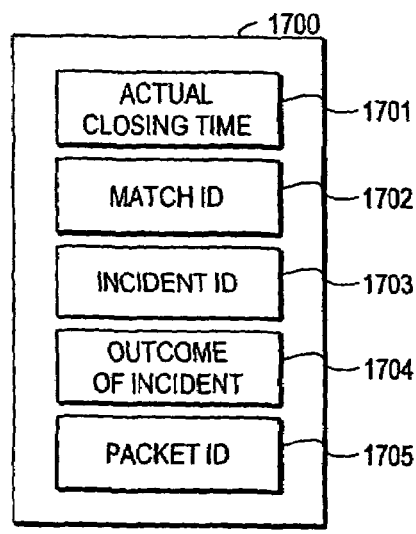
FIG. 17 illustrates another advantageous message structure used within the method of FIGS. 14a to 14c.
Figure 18:
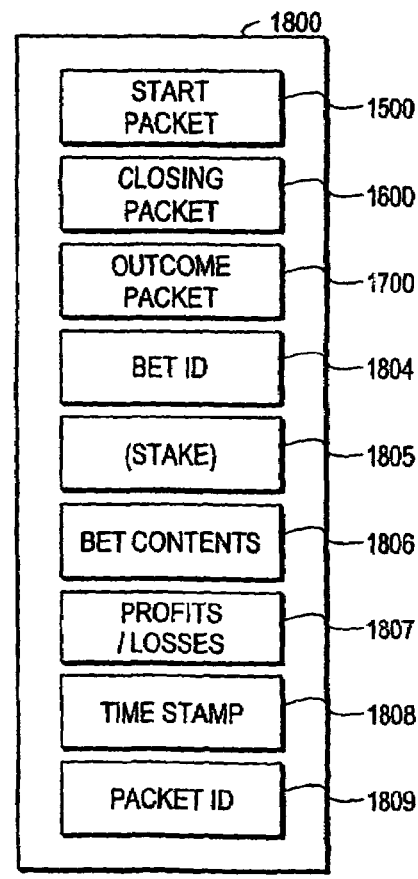
FIG. 18 illustrates another advantageous message structure used within the method of FIGS. 14a to 14c.

FIGS. 14a to 14c illustrate the progress of events and exchange of messages in the exemplary betting game. Rounded rectangles illustrate functions performed at a certain location, right-angled rectangles illustrate messages transmitted point-to-point between two locations and jagged rectangles illustrate broadcastings of point-to-multipoint type. At step 1401 the player registers himself as a registered player in the betting system of the organiser. This is the initial step where both the player and the organiser must authenticate themselves to the other party so that secure communications connections may be set up therebetween later. At step 1402 the organiser sets up a user account for the player. We assume that the organiser does not allow betting on credit, so at step 1403 the organiser asks the player to make an advance payment into his user account. The advance payment is accomplished according to some mutually accepted form of making payments. It is possible that the whole procedure of registering and making the advance payment is performed over the counter at the organiser's authorised representative, but in FIG. 14a we assume that electronic transactions are used. At step 1404 the player instructs the bank to transfer money to the organiser; debiting the player's account at the bank is accomplished at step 1405 and followed by a report from the bank to the organiser at step 1406 so that the player's user account at the organiser's betting system can be correspondingly credited at step 1407.

At step 1408 the organiser preliminarily announces the next occasion of a betting game or a number of betting games. For example, if the invention is applied to implement instant betting on the special events in a soccer game, the announcement of step 1408 could be made (even several times) before the beginning of the game. It is a broadcast message of point-to-multipoint type, so basically it can be made either as a general packet broadcasting in the packet-switched network or through the digital broadcasting network. This is illustrated in FIG. 14a by showing also a dashed line through the broadcaster as an alternative delivery route for the message. The announcement of step 1408 comprises general information regarding the oncoming (number of) betting game(s). In our soccer example the announcement could comprise for example an identifier of the match, a list of those special events that are to be the objects of individual bettings (corners, free kicks, penalty kicks, etc.), and limits for acceptable stakes. The announcement of step 1408 may also comprise the definition of a guard period, which we will explain in more detail later.

When the player has received the announcement of step 1408, he has the choice whether or not to take part in the announced betting game or number of betting games. In the case of FIG. 14a the player decides to take part, so at step 1409 he transmits his registration for the announced betting game or number of betting games. The registration of the player must be authenticated so that the player has access to his user account in the organiser's system. The registration message may comprise for example a maximum limit for the sum of money which the player is willing to use in the announced game(s) and the value of a default stake which the player wants to use in an individual bet if not otherwise stated later. At step 1410 the organiser's system acknowledges the message sent by the player at step 1409. In the message of step 1410 the organiser may confirm the balance of the player's user account and also repeat the information given by the player at step 1409 so that the player may check that everything is in order for playing.

At step 1411 the organiser announces that a certain individual betting incident has begun and the players may start placing bets. The announcement of step 1411 is again of point-to-multipoint type. The message of step 1411 may be for example of the type shown in FIG. 15. The message 1500 of FIG. 15 comprises a starting time 1501 which means the moment after which the placing of bets is allowed, a match identifier 1502 which identifies the higher-level hierarchical concept of which the particular incident announced in the message 1500 is a part (e.g. "FC Milan against Manchester United on 2 Jul. 2000), an incident identifier 1503 which identifies the individual betting incident concerned (e.g. "ManU $1^{st}$ corner"), an incident descriptor 1504 which is meant to convey some textual information to the player (e.g. "ManU corner from left on the $12^{th}$ minute: will they score a goal?"), a list 1505 of the alternative outcomes on which the players may place bets (e.g. "1: Immediate goal, X: Indirect goal in next 15 seconds, 2: No goal"), the rates 1506 at which the players may win at each alternative outcome (e.g. "1: 12.0, X: 7.0, 2: 1.05"), a packet identifier 1507 which may also act as a checksum for checking the integrity of the packet, and a definition 1508 of what will constitute the clock signal for the current betting incident and which algorithm should be used for time-stamping. The last-mentioned is not necessary if a permanently defined clock and algorithm arrangement is used or if the definition of the clock signal and the selection of algorithm has been given in one of the messages of steps 1408 or 1410.

In FIG. 14b we assume that a part of a digital bit stream broadcast from the broadcaster constitutes the clock signal. Such broadcastings are typically constantly on, so there should be a constant flow of clock signals from the broadcaster to the player in FIGS. 14a, 14b and 14c, but for the sake of clarity only the clock signals 1412 to 1418 are shown in FIG. 14b. Each of these clock signals may be for example a certain combination of bits in a transmission frame transmitted by the broadcaster. If a watchdog algorithm of the kind described previously is running in the player's terminal arrangement, the transmissions 1412 to 1418 in FIG. 14b might contain the keys needed to keep the watchdog "alive".

At step 1419 the player places a bet, which means that he makes his selection among the alternatives given in the message of step 1411 and gives appropriate commands to his terminal, which responds by generating a time-stamped bet record. Depending on the definition of time-stamping, the terminal may use various combinations of the clock signals 1412 to 1418. The terminal could use for example only the latest clock signal 1414, or it and the next subsequent clock signal 1415, or even a calculated combination of all clock signals 1412 to 1414 from the reception of the beginning announcement of step 1411 to the moment when the player places his bet. According to the principle of off-line electronic betting the terminal does not need to transmit the time-stamped bet record to the organiser immediately (although the invention does not prevent him from doing so). If some of the embodiments of FIGS. 7 to 8b would be used, step 1419 would also comprise the procedure of transmitting the bet record to the auxiliary device and time-stamping it there.

At some later time the incident the outcome of which was the object of betting is over, and the outcome becomes known.

The moment after which it must be impossible to place valid bets is presented in FIG. 14b as the actual closing time 1420. For the sake of example FIG. 14b shows also the attempted placing of a bet at step 1421, which is after the actual closing time. The organiser broadcasts an announcement of the end of betting at step 1422. However, the concept of guard period is applied, so the moment of transmitting the message of step 1422 is not decisive: the time for placing valid bets ended at moment 1420. The invention does not require a guard period to be used, and the invention allows the guard period to have even a different sign than that shown in FIG. 14b. The latter means that the time for placing valid bets may even continue after the delivery of the message of step 1422, so that the message comes first and the actual closing time only thereafter. The message of step 1422 may be for example of the type shown in FIG. 16. The message 1600 of FIG. 16 comprises a closing announcement time 1601 which may be different than the actual closing time and means the moment of transmitting the packet 1600, a match identifier 1602 which is the same as match identifier 1502 in FIG. 15, an incident identifier 1603 which is the same as the incident identifier 1503 in FIG. 15 and a packet identifier 1604 which may also act as a checksum for the integrity of the packet 1600. The packet 1600 could also comprise an announcement of the actual closing time 1420.

The reception at the user's terminal arrangement of the message that indicates that no more bets are allowed should immediately disable the terminal arrangement from generating any more such bet records related to the closed betting game that could under any conditions be interpreted as having been validly time-stamped. This should happen regardless of the reading or even availability of a local real time clock signal in the terminal arrangement at the moment of receiving the message. Such conditionless closing of betting at the terminal arrangement is again a security measure against cheating attempts that could try e.g. delaying the moment at which the betting application in the terminal arrangement realizes that a closing message has indeed arrived.

At step 1423 the organiser broadcasts the official outcome of the betting incident that was closed at step 1422. The message broadcast at step 1423 may be for example of the type shown in FIG. 17. The message 1700 of FIG. 17 comprises the actual closing time 1701 which refers now to the moment 1420 shown in FIG. 14b, a match identifier 1702 which is the same as match identifier 1502 in FIG. 15, an incident identifier 1703 which is the same as the incident identifier 1503 in FIG. 15, the outcome 1704 of the incident which was the object of betting, and a packet identifier 1705 which may also act as a checksum for the integrity of the packet 1700.

Based on its knowledge about which bets the player did place before the actual closing time and which was the actual outcome, the player's terminal calculates at step 1424 the expected effect of the betting incident on the player's user account. This calculation is preliminary and its purpose is just to anticipate the official calculation of results so that the player receives immediate feedback and so that the player knows, how much money he has left in his user account for possible subsequent betting incidents during the same match. According to one embodiment of the invention the terminal generates and stores an outcome record which may be even time-stamped in the same way as the previously mentioned time-stamped bet record.

Other betting incidents could now follow so that the procedure of steps 1411 to 1424 would be repeated. For the reasons of graphical clarity we assume in FIG. 14b that no further betting incidents occur. At step 1425 the organiser announces that the entity of game(s) that was dealt with at steps 1408 to 1410 has ended. At the same time the organiser may announce the deadline for returning the time-stamped bet records to the organiser for the official calculation of results. The last-mentioned announcement is not needed if the definition of a deadline is constant, like 24 hours from the announcement of step 1425.

As we noted before, the invention does not actually forbid the player's terminal from transmitting the time-stamped bet records earlier to the organiser. However, in FIG. 14b we assume that the terminals start transmitting the time-stamped bet records only after they have received the message of step 1425. In order not to make all terminals transmit their time-stamped bet records at the same time, it may be required that the terminal applies a certain delay after having received the message of step 1425. The length of the delay may be predetermined for each terminal, or the terminals may use some random or pseudorandom process to generate individual delay lengths. At step 1426 the terminal transmits the time-stamped bet record generated at step 1419 to the organiser, and at step 1427 it transmits the same time-stamped bet record to the supervisor. The transmission of the bet record may be for example of the type shown in FIG. 18. The message 1800 of FIG. 18 comprises a copy of the start packet 1500, a copy of the closing packet 1600, a copy of the outcome packet 1700, a bet identifier 1804 for identifying an individual placed bet, the stake 1805 placed in the bet (not needed if some default stake is used), the bet contents 1806, i.e. the player's guess of the outcome of the incident which was the object of betting, the terminal's preliminary calculation 1807 of the player's profits or losses in the bet (i.e. the outcome record, if such was generated), a time stamp 1808 which shows the time when the bet was placed, and a packet identifier 1809 which may also act as a checksum for the integrity of the packet 1900. The time stamp could also be a part of the bet contents field 1806, and possibly also a part of the outcome record field 1807.

At step 1428 the terminal transmits the time-stamped bet record generated at step 1421 to the organiser, and at step 1429 it transmits the same time-stamped bet record to the supervisor. It is not required that the time-stamped bet records are transmitted in different transmissions; indeed, in order to keep the number of individual transmissions to a minimum it may be advantageous to compose a single transmission comprising all individually time-stamped bet records. The terminal is already aware that the bet record generated at step 1421 was invalid, so it has not taken it into account at step 1424 when preliminarily calculating the effect on the player's user account, and it also does not place anything related to the invalid bet into the outcome record field 1807 concerning the terminal's preliminary calculation of the player's profits or losses.

It is questionable, whether the terminal should report at all such bets which were placed after the actual closing time and which thus have no effect on the player's user account. However, it is important to the operation of the betting system that the terminal reports all bets which were validly placed between the opening time and the actual closing time, because it must not be possible for the player to prevent the terminal from reporting those bets which were not successful. According to one embodiment of the invention there is within the terminal a protected algorithm (which may well be the same as or in close connection to the time-stamping algorithm) which accumulates a counter each time when a bet is placed and which discloses the highest counter value reached before the actual closing time in all subsequent transmissions of time-stamped bet records to the organiser and the supervisor. According to that embodiment of the invention the organiser does not accept the time-stamped bet records from a certain user unless their number is large enough to bring a corresponding counter at the organiser's system to the same value.

At step 1430 the organiser checks all received, time-stamped bet records to make sure that it has received complete reports from all those terminals that were registered to the game earlier at step 1409. If the deadline expires without a complete report having been received from a certain player, the organiser may freeze the user account of that player and prevent the player from accessing the betting system again (the reason thereto being the organiser's suspicion about the player trying to prevent the transmission of unsuccessful bet records. The checks performed at step 1430 comprise also a balance verification check the purpose of which is to ensure that a player has not placed a bet with a larger stake than what he can afford with the current balance of his user account. After all bet records have been analysed, the organiser updates the user accounts at step 1431 so that the profits are credited to the winning players' accounts and the stakes are deducted from the user accounts of all players that placed bets.

At step 1432 the organiser transmits the final results to the players and to the supervisor. The information regarding betting results is typically confidential, so this transmission is of point-to-point type at least logically if not physically. Logical point-to-point transmissions in a shared physical broadcasting media of point-to-multipoint type can be accomplished by using codes that are only known to the authorised parties. At step 1433 the player's terminal displays the final results to the player, and at step 1434 the supervisor may compare the final results against the transmissions received from the players in order to check that the betting went according to applicable regulations.

At step 1435 the player expresses a wish to log out from the system altogether, which causes his user account at the organiser's system to be emptied at step 1436 and the remaining amount of money to be transferred to the user's bank account in steps 1437 and 1438. At step 1439 the player receives a balance notice from the bank indicating that the transactions have been completed.

Figure 19:
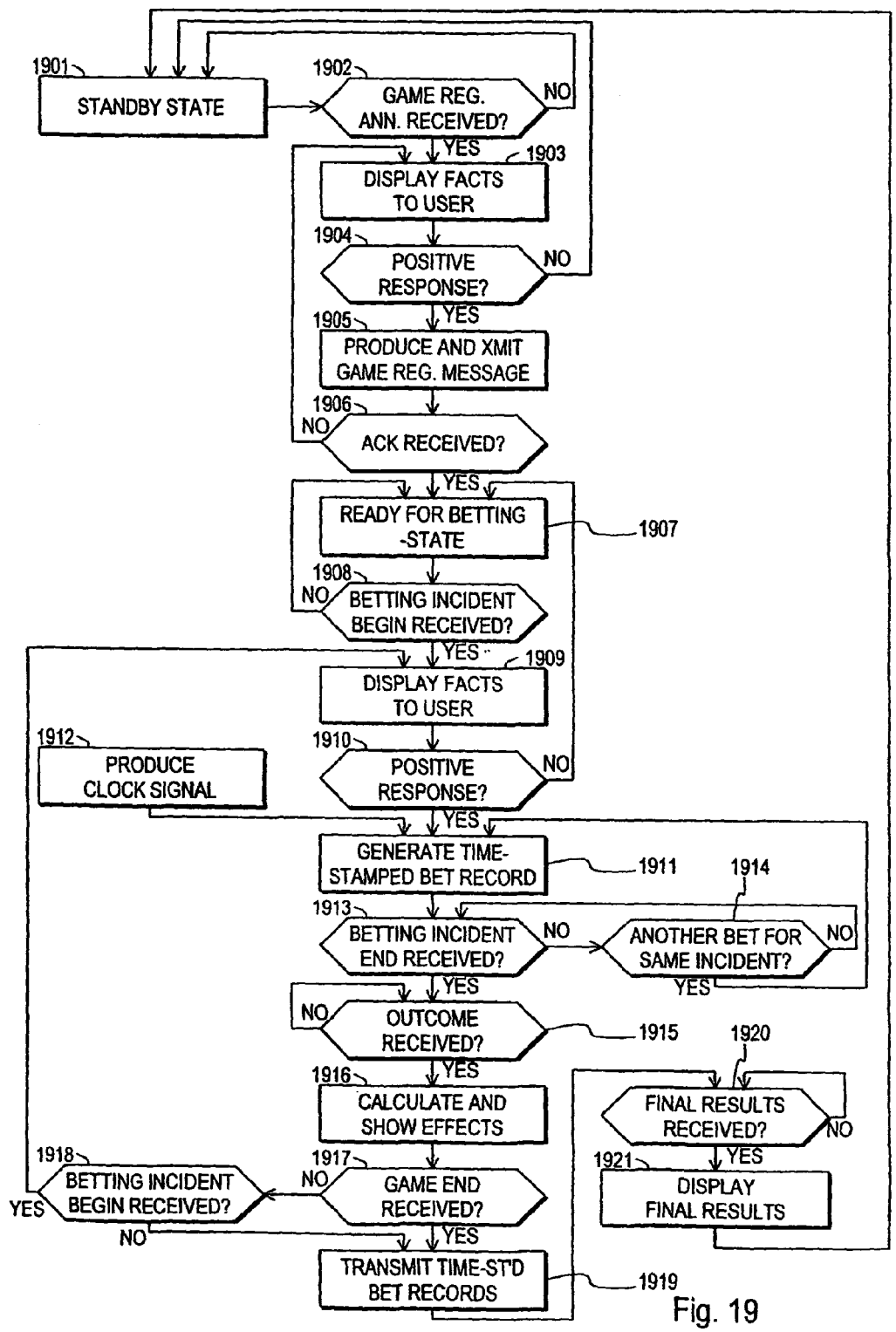
FIG. 19 illustrates a method executed by a terminal according to an embodiment of the invention and FIG. 20 illustrates a method executed by an organiser's system according to an embodiment of the invention.

FIG. 19 summarises the main functions of the terminal arrangement in executing the betting part of the method described above. The term "terminal arrangement" should be used, because the invention does not require the terminal to be a single device. An exemplary multi-device terminal arrangement may consist of a television set, a set-top-box, a memory module coupled to the set-top-box and a wireless remote controller. However, usually the shorter term "terminal" is used for the sake of brevity. Registering as an acknowledged user of a system and setting up an user account as well as paying a certain sum to the user account are known as such to the person skilled in the art, so the functions that relate to steps 1401-1407 in FIG. 14 are not illustrated in FIG. 19.

The loop through steps 1901 and 1902 constitutes a standby state where the terminal waits for the next announcement of oncoming betting game(s). When such an announcement has arrived, the terminal displays its contents to the user at step 1903. If a positive response is received from the user at step 1904, a game registration message is produced and transmitted at step 1905; otherwise the terminal returns to the standby state. At step 1906 the terminal waits for the game registration message to be acknowledged. If the acknowledgement does not come in due time the terminal assumes that the game registration message has been lost and returns to step 1903 for the generation of a new one.

After the acknowledgement has been received, the terminal goes into the standby state constituted by steps 1907 and 1908. When an announcement for the beginning of a betting incident arrives, its contents are displayed to the user at step 1909. Now the user has the choice of betting or not betting. The latter alternative means returning from the decision step 1910 to step 1907, while a positive response from the user causes a time-stamped bet record to be generated at step 1911. The production of a clock signal at step 1912 as input information to step 1911 may take the form of receiving and processing an external clock signal or generating an internal clock signal. The generation of further bet records for the same incident is possible if before the reception of betting end signal at step 1913 the user gives appropriate commands at step 1914.

After receiving the betting end signal at step 1913 the terminal waits for the outcome message at step 1915. When it has arrived, the terminal calculates the effect of the outcome and displays it to the user at step 1916. Step 1917 is a check for the possible reception of a game end message; if none has been received yet but a new betting incident comes up according to step 1918 the terminal returns to step 1909. Although not illustrated in FIG. 19, also overlapping and nested betting incidents are allowed in the invention: a new betting incident may be declared open before a previous betting incident has been closed, and such a more recently opened betting incident may even be declared closed before the older one.

When the game end signal has been received at step 1917, the terminal starts the procedures that aim at transmitting the time-stamped bet records to the organiser at step 1919. The terminal may apply for example polling at arbitrary time intervals to check, whether the organiser's system is ready for receiving the time-stamped bet record transmission(s). A large number of terminals may be attempting these transmissions simultaneously, so an effective collision resolution protocol is needed to ensure successful transmission of all bet records. Implementing such collision protocols is known as such to the person skilled in the art. After having succeeded in transmitting the time-stamped bet records the terminal waits for the final results message from the organiser at step 1920 and finally displays the final results to the user at step 1921. The steps that relate to the procedures of logging off and cashing in the user account are again not shown in FIG. 19, because they are regarded to represent technology known as such to the person skilled in the art.

Figure 20:
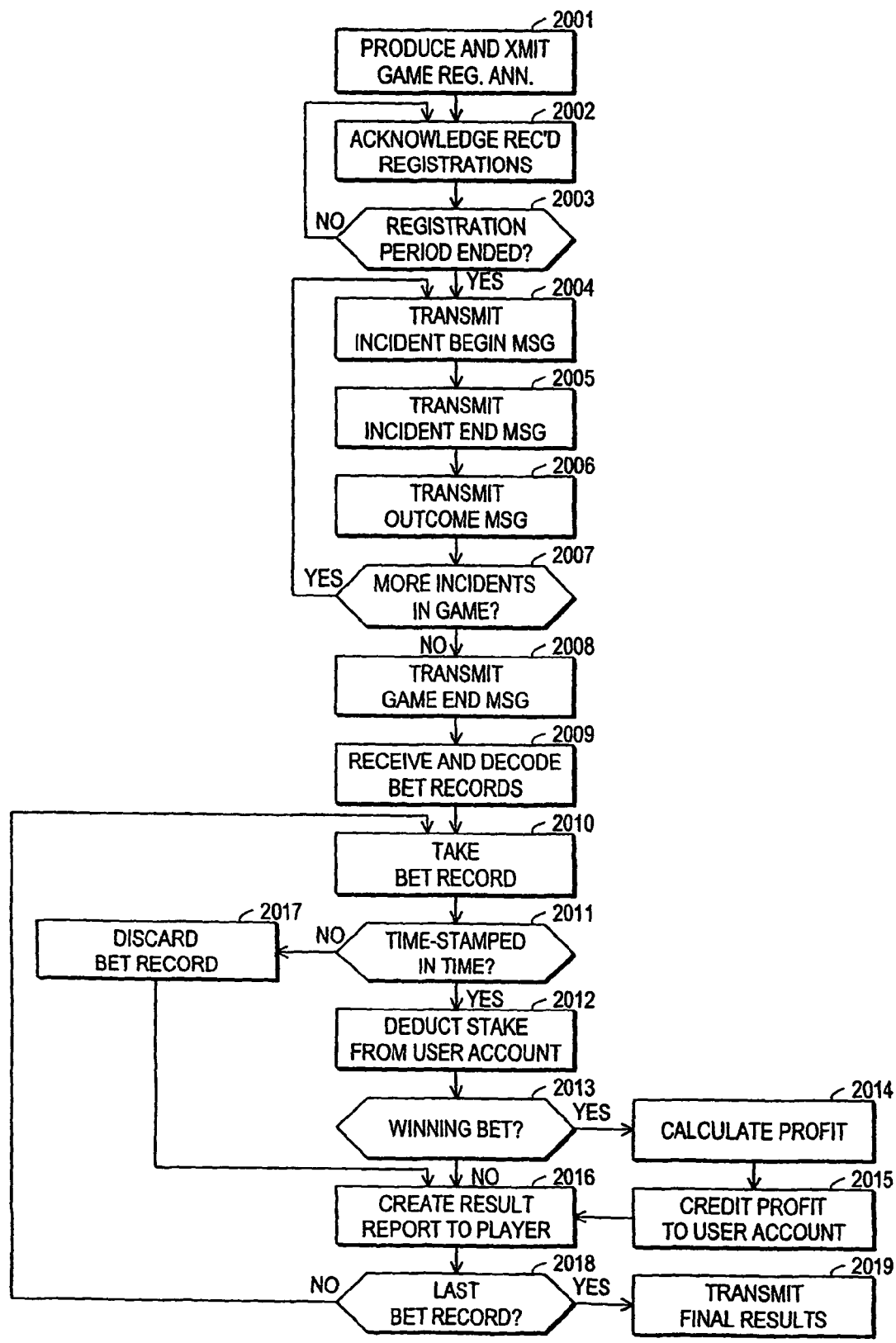

FIG. 20 illustrates correspondingly the functional steps executed by the organiser's system between steps 1407 and 1435 of FIG. 14. At step 2001 the system generates and transmits the announcement and call for game registrations. In the loop constituted by steps 2002 and 2003 the system waits for the game registration period to end and acknowledges the game registrations it receives. When a betting incident comes up, the system transmits the incident begin message at step 2004, and somewhat later it transmits the incident end message at step 2005 and the outcome message at step 2006. At step 2007 it is checked, whether still more incidents will take place in the same game. If yes, the system returns to step 2004 and if not, a game end message is transmitted at step 2008. After that (or even before, as the invention does not forbid that) the time-stamped bet records start pouring in. These are received and possibly already decoded at step 2009; decoding at an early stage is advantageous especially if the transmissions contain a checksum and the system must acknowledge all transmissions that come in intact as proved by the checksum.

When the deadline for returning the bet records has been passed (or even before, if the betting ratios are fixed so that the contents of the incoming bet records do not affect the calculation of profits) the system starts the task of updating user accounts. It takes a bet record at step 2010 and checks its time stamp at step 2011. All bet records that had been generated in time cause the corresponding stake to be deducted at step 2012 from the user account of the player who placed the bet. If the bet is found at step 2013 to be a winning bet, the profit is calculated at step 2014 and credited to the corresponding user account at step 2015. Regardless of whether steps 2014 and 2015 were executed or not after step 2013, a result report to the player is created at step 2016. Even if the bet record was found invalid at step 2011 due to not having been time-stamped in time and consequently discarded at step 2017, a report is most advantageously created at step 2016. Step 2018 is just a check whether all bet records were handled already; if not the system returns to step 2010 and if yes, the final results are transmitted out at step 2019.

The above-described exemplary embodiments of the invention should not be construed to place limitations to the scope of protection which is defined in the appended claims. The verb "to comprise" is used in this patent application as an open limitation, meaning that it does not exclude the existence of also other features than those explicitly mentioned. The features recited in the depending claims are freely combinable unless explicitly otherwise stated.

The invention claimed is:

1. A method for handling, within a communication system comprising a distributed domain and a central domain, electronic records that contain predictions of the outcome of a certain incident, comprising:
   before the outcome of the incident is known, generating, within the distributed domain a plurality of electronic records that contain predictions of the outcome of the incident;
   after the outcome of the incident is known, conveying the electronic records from the distributed domain to the central domain and within the central domain;
   determining which of the electronic records contain correct predictions of the outcome of the incident;
   furnishing, within the distributed domain, each of the electronic records with a cryptographically protected proof of a certain moment of time associated with the generation of the electronic record, the proof being configured to indicate that the respective record was created prior to an entry deadline, the entry deadline being not later than the time the outcome of the event is known, by
      receiving an external clock signal into a protected integrated circuit,
      receiving an electronic record into said protected integrated circuit,
      receiving a local real time clock signal into said protected integrated circuit, said local real time clock signal being simultaneously used for synchronising at least one operation belonging to a category of Media Access Control operations,
      furnishing said electronic record with a cryptographically protected proof of a certain moment of time through the application of an algorithm read from a storage location within said protected integrated circuit, the algorithm using both said local clock signal and said external clock signal;
   outputting the electronic record furnished with a cryptographically protected proof of a certain moment of time from said protected integrated circuit; and
   accepting, within the central domain, only those of the electronic records conveyed thereto as valid for which the cryptographically protected proof of the certain moment of time associated with the generation of the electronic record shows that said certain moment of time was not later in time than the entry deadline.

2. The method of claim 1, wherein
said algorithm generates a time-stamped electronic record using the plaintext contents of the electronic record.

3. The method of claim 2, further comprising:
authenticating and encrypting the electronic record by using also a private key of the party generating the electronic record and a public key of an intended recipient of the time-stamped, authenticated, encrypted electronic record as input information to said algorithm.

4. The method of claim 1, wherein furnishing each of the electronic records with a cryptographically protected proof of a certain moment of time associated with the generation of the electronic record further comprises:
   generating an authenticated and encrypted electronic record through the application of a first algorithm which uses the plaintext contents of the electronic record, a private key of the party generating the electronic record and a public key of an intended recipient of the time-stamped, authenticated, encrypted electronic record as input information to said first algorithm; and
   time-stamping the authenticated and encrypted electronic record generated by said first algorithm through the application of a second algorithm which additionally uses a clock signal and a private key of the party performing the time-stamping as input information.

5. The method of claim 4, further comprising:
between the generating an authenticated and encrypted electronic record and the time-stamping the authenticated and encrypted electronic record, conveying the authenticated and encrypted electronic record from a first device which generated the authenticated and encrypted electronic record to a second device which performs the time-stamping.

6. The method of claim 1, further comprising:
generating, within a certain device belonging to the distributed domain, an electronic record that contains a prediction of the outcome of the incident;
furnishing, within said certain device belonging to the distributed domain, the generated electronic record with a cryptographically protected proof of a certain moment of time associated with the generation of the electronic record, thus producing a time-stamped electronic record;
conveying the generated and time-stamped electronic record from said certain device belonging to the distributed domain to the central domain;
accepting, within the central domain, the generated and time-stamped electronic record as valid on the condition that the cryptographically protected proof of a certain moment of time shows that said certain moment of time was not later in time than the entry deadline; and
within the central domain and after the outcome of the incident is known, responsive to the generated and time-stamped electronic record being accepted as valid, determining whether the generated and time-stamped electronic record contains a correct prediction of the outcome of the incident.

7. The method of claim 1, further comprising:
generating, within a certain first device belonging to the distributed domain, an electronic record that contains a prediction of the outcome of the incident;
conveying the generated electronic record from said first device belonging to the distributed domain to a second device belonging to the distributed domain;

furnishing, within said second device belonging to the distributed domain, the generated electronic record with a cryptographically protected proof of a certain moment of time associated with the generation of the electronic record, thus producing a time-stamped electronic record;

conveying the generated and time-stamped electronic record from said second device belonging to the distributed domain to the central domain;

accepting, within the central domain, the generated and time-stamped electronic record as valid on the condition that the cryptographically protected proof of a certain moment of time shows that said certain moment of time was not later in time than the entry deadline; and within the central domain and after the outcome of the incident is known, responsive to the generated and time-stamped electronic record being accepted as valid, determining whether the generated and time-stamped electronic record contains a correct prediction of the outcome of the incident.

8. The method of claim 1, further comprising:

generating, within a certain first device belonging to the distributed domain, an electronic record that contains a prediction of the outcome of the incident;

conveying the generated electronic record from said first device belonging to the distributed domain to a second device belonging to the distributed domain;

furnishing, within said second device belonging to the distributed domain, the generated electronic record with a cryptographically protected proof of a certain moment of time associated with the generation of the electronic record, thus producing a time-stamped electronic record;

conveying the generated and time-stamped electronic record from said second device belonging to the distributed domain back to said first device belonging to the distributed domain;

conveying the generated and time-stamped electronic record from said first device belonging to the distributed domain to the central domain;

accepting, within the central domain, the generated and time-stamped electronic record as valid on the condition that the cryptographically protected proof of a certain moment of time shows that said certain moment of time was not later in time than the entry; and within the central domain and after the outcome of the incident is known, responsive to the generated and time-stamped electronic record being accepted as valid, determining whether the generated and time-stamped electronic record contains a correct prediction of the outcome of the incident.

9. The method of claim 1, wherein furnishing each of the electronic records with a cryptographically protected proof of a certain moment of time associated with the generation of the electronic record, further comprises:

generating a clock signal within a protected integrated circuit;

receiving an electronic record into said protected integrated circuit;

furnishing said electronic record with a cryptographically protected proof of a certain moment of time through the application of an algorithm read from a storage location within said protected integrated circuit and using said clock signal generated within said protected integrated circuit; and outputting the electronic record furnished with a cryptographically protected proof of a certain moment of time from said protected integrated circuit.

10. The method of claim 1, further comprising:

a) transmitting a begin signal from the central domain to the distributed domain;

b) generating, within the distributed domain, a plurality of electronic records each furnished with a cryptographically protected proof of a certain moment of time associated with the generation of the electronic record;

c) transmitting an end signal from the central domain to the distributed domain; and d) transmitting from the distributed domain to the central domain the electronic records generated before the reception of said end signal.

11. The method of claim 10, further comprising:

after c) but before d), c1) transmitting an outcome signal from the central domain to the distributed domain.

12. The method of claim 11, further comprising:

after c1), c2) calculating, within a certain device belonging to the distributed domain, a preliminary betting result on the basis of the received outcome signal and the electronic records generated in b) in said certain device belonging to the distributed domain.

13. The method of claim 10, further comprising:

after c) but before d), c3) transmitting a game closed signal from the central domain to the distributed domain; so that d) is only performed responsive to receiving said game closed signal within the distributed domain.

14. The method of claim 10, further comprising:

before a), registering a plurality of users of terminal arrangements belonging to the distributed domain as registered users of a betting system belonging to the central domain; and setting up, at the central domain, a user account for each registered user.

15. The method of claim 10, further comprising:

before a), transmitting from the central domain to the distributed domain a preliminary announcement of an oncoming begin signal; and responding to the preliminary announcement within the distributed domain by transmitting to the central domain messages indicating the willingness to react to the begin signal by generating electronic records.

16. A method for handling, within a terminal arrangement that belongs to the distributed domain of communications system including a distributed domain and a central domain, electronic records that contain predictions of the outcome of a certain incident, comprising:

locally generating a clock signal, the locally generated clock signal also being used for syncrhonising at least one operation belonging to a category of Media Access Control operations;

locally generating an electronic record that contains a prediction of the outcome of the incident and transmitting the electronic record to the central domain; and furnishing the electronic record, before transmitting the electronic record to the central domain, with a cryptographically protected proof of a certain moment of time associated with the generation of the electronic record by using the locally generated clock signal, the locally generated electronic record and a cryptographic algorithm to generate a time-stamped electronic record, the cryptographically protected proof configured to indicate that the record was created prior to an entry deadline, the deadline being earlier than the time the outcome of the certain incident is known.

17. The method of claim 16, further comprising:
receiving an external clock signal; and
using the received external clock signal to generate the time-stamped electronic record.

18. The method of claim 17, further comprising:
receiving an external digital bit stream and extracting a plurality of bits from the received external digital bit stream; and
using the extracted plurality of bits as said received external clock signal.

19. The method of claim 18, further comprising:
as part of receiving an external digital bit stream, receiving a digital radio signal of the Digital Audio Broadcasting format.

20. The method of claim 18, further comprising:
as part of receiving an external digital bit stream, receiving a digital radio signal of the Digital Video Broadcasting format.

21. The method of claim 16, further comprising:
a) receiving a preliminary announcement of an oncoming begin signal;
b) as a response to a positive response from a user, transmitting to the central domain a game registration message indicating willingness to take part in a certain game the beginning of which is to be marked by said oncoming begin signal;
c) receiving the begin signal announced by said preliminary announcement,
d) as a response to a positive response from the user, generating an electronic record that contains a prediction of the outcome of an incident and furnishing the electronic record with a cryptographically protected proof of a certain moment of time associated with the generation of the electronic record;
e) receiving an end signal;
f) receiving an outcome signal;
g) on the basis of the received outcome signal and the contents of said prediction of the outcome of the incident, calculating and displaying a preliminary result;
h) receiving a game closed signal;
i) transmitting the electronic record generated in d) to the central domain;
j) receiving a final results message; and
k) on the basis of the contents of said final results message, displaying a final result.

22. The method of claim 21, wherein i) further comprises:
transmitting to the central domain, together with the electronic record generated in d), copies of said begin signal, said end signal, said outcome signal and said preliminary result.

23. A computer program product stored on a tangible medium, comprising software code portions configured to cause a computer to perform the method of claim 16 when said product is run on the computer.

24. A computer program product stored on a tangible computer usable medium, comprising computer readable program means for causing a computer to perform the method of claim 16 when said product is run on a computer.

25. A method for handling, within a computer system that belongs to the central domain of a communications system including a distributed domain and a central domain, electronic records that contain predictions of the outcome of a certain incident, comprising:
receiving from the distributed domain a multitude of electronic records that contain predictions of the outcome of the incident;
after the outcome of the incident is known, determining which of the electronic records contain correct predictions of the outcome of the incident; and
accepting only those of the electronic records received from the distributed domain as valid for which a cryptographically protected proof of a certain moment of time associated with the generation of the electronic record shows that said certain moment of time was not later in time than an entry deadline before the outcome of the incident is known;
a) transmitting a preliminary announcement of an oncoming begin signal;
b) as a response to game registration messages received from the distributed domain and indicating willingness to take part in a certain same the beginning of which is to be marked by said oncoming begin signal, registering each user who transmitted a game registration message as a participant in said game;
c) transmitting the begin signal announced by said preliminary announcement;
d) transmitting an end signal;
e) transmitting an outcome signal;
f) transmitting a game closed signal;
g) receiving a plurality of transmissions from the distributed domain;
h) determining which of said transmissions from the distributed domain were electronic records that contained validly placed predictions of the outcome of the incident;
i) of the received electronic records that contained validly placed predictions of the outcome of the incident, determining which of them contained successful predictions;
j) debiting the price for participating in said game from certain user accounts of those registered participants in said game from which there were received electronic records that contained validly placed predictions of the outcome of the incident;
k) crediting certain profits to certain user accounts of those registered participants in said game from which there were received electronic records that contained successful and validly placed predictions of the outcome of the incident; and
l) transmitting a final results signal that represents the debiting and crediting operations performed in j) and k).

26. The method of claim 25 further comprising:
checking whether transmissions were received in g) from all those participants from which game registration messages were received in b); and
indicating as suspicious those participants from which game registration messages were received in b) but transmissions were not received in g).

27. A computer program product stored on a tangible medium, said computer program product comprising software code portions configured to, when executed by a computer, to cause the computer to perform the method of claim 25.

28. A computer program product stored on a tangible medium, comprising computer readable program means for causing a computer to perform the method of claim 25 when said product is run on the computer.

29. A terminal arrangement for handling electronic records that contain predictions of the outcome of a certain incident, comprising:
bet record generation means for generating an electronic record that contains a prediction of the outcome of the incident;

transmitter means for transmitting the electronic record to a central domain; and a protected integrated circuit having a memory for storing an algorithm for furnishing the electronic record, before transmitting the electronic record to the central domain, with a cryptographically protected proof of a certain moment of time associated with the generation of the electronic record, the cryptographically protected proof configured to indicate that the record was created prior to an entry deadline, the deadline being earlier than the time the outcome of the certain incident is known, a transceiver means configured to communicate with a device belonging to said central domain, said transceiver being arranged to perform operations belonging to a category of Media Access Control operations and said transceiver means being coupled to said protected integrated circuit and providing said protected integrated circuit with a clock signal that said transceiver is also arranged to use for synchronizing at least one operation belonging to said category of Media Access Control operations, and within said protected integrated circuit, means for using said algorithm to cryptographically combine a clock signal received from said transceiver means to an electronic record that contains a prediction of the outcome of a certain incident.

30. The terminal arrangement of claim 29, further comprising:

within said protected integrated circuit an internal clock signal source; and within said protected integrated circuit means for using said algorithm to cryptographically combine the output of said internal clock signal source to an electronic record that contains a prediction of the outcome of a certain incident.

31. The terminal arrangement of claim 29, further comprising:

receiver means for receiving an external clock signal, said receiver means being coupled to said protected integrated circuit; and within said protected integrated circuit means for using said algorithm to cryptographically combine said external clock signal to an electronic record that contains a prediction of the outcome of a certain incident.

32. The method of claim 1, wherein furnishing each of the electronic records with a cryptographically protected proof of a certain moment of time associated with the generation of the electronic record is performed as part of a time-stamping process using a clock signal from a clock transmission source external to the distributed domain.

33. The method of claim 32, wherein the clock signal is a clock signal of essentially constant broadcast.

34. The method of claim 16, wherein furnishing each of the electronic records with a cryptographically protected proof of a certain moment of time associated with the generation of the electronic record is performed as part of a time-stamping process using a clock signal from a clock transmission source external to the distributed domain.

35. The method of claim 34, wherein the clock signal is a clock signal of essentially constant broadcast.

36. The method of claim 25, further comprising:

providing a clock signal of essentially constant broadcast to the distributed domain, wherein the cryptographically protected proof of the certain moment of time is created with a timestamping process using the clock signal.

37. The terminal arrangement of claim 29, wherein the means for furnishing the electronic record with a cryptographically protected proof of a certain moment of time performs a timestamping process using a clock signal from a clock transmission source external to the distributed domain.

38. The terminal arrangement of claim 37, wherein the clock signal is a clock signal of essentially constant broadcast.

39. The terminal arrangement of claim 37, further comprising a clock transmission source external to the distributed domain, the clock source providing a clock signal used in a timestamping process as part of the furnishing the cryptographically protected proof.

40. The terminal arrangement of claim 39, wherein the clock signal is a clock signal of essentially constant broadcast.

41. A method for handling electronic wagering records that contain predictions of the outcome of a certain incident, comprising:

within a distributed domain, furnishing each of a plurality of electronic wagering records with a cryptographically protected proof of a certain a certain moment of time associated with the generation of the electronic wagering record by receiving an external clock signal into a protected integrated circuit, receiving an electronic wagering record into said protected integrated circuit, receiving a local real time clock signal into said protected integrated circuit, the local real time clock signal being used simultaneously for syncrhonising at least one operation belonging to a category of Media Access Control operations, and furnishing said electronic wagering record with a cryptographically protected proof of a certain moment of time through the application of an algorithm read from a storage location in said protected integrated circuit and using both said external clock signal and said local real time clock signal;

outputting the electronic wagering record furnished with a cryptographically protected proof of a certain moment of time from said protected integrated circuit; and within the central domain, accepting only those of the electronic wagering records conveyed thereto as valid for which the cryptographically protected proof of a certain moment of time associated with the generation of the electronic record shows that said certain moment of time was not later in time than an entry deadline, the entry deadline being a time before the outcome of the incident is known.

42. The method of claim 41, further comprising:

before the outcome of the incident is known, generating within a distributed domain, the plurality of electronic wagering records that contain predictions of the outcome of the incident;

conveying the electronic wagering records from the distributed domain to a central domain; and after the outcome of the incident is known, within the central domain, determining which of the electronic wagering records contain correct predictions of the outcome of the incident.

43. The method of claim 42, further comprising:

generating the cryptographically protected proof in the distributed domain using as input a clock signal of essentially constant broadcast from a clock transmission external to the digital domain.

44. The method of claim 42, wherein the distributed domain comprises a plurality of user terminals and wherein the central domain comprises a central database.

45. The method of claim 44, wherein the user terminals include mobile devices.

46. The method of claim 41, further comprising:
as part of furnishing each of the electronic records with a cryptographically protected proof of a certain moment of time associated with the generation of the electronic wagering record, generating a time-stamped electronic wagering record using the plaintext contents of the electronic wagering record and a clock signal.

47. The method of claim 46, further comprising:
authenticating and encrypting the electronic wagering record using a private key of a party generating the electronic wagering record and a public key of an intended recipient of the time-stamped, authenticated, encrypted electronic wagering record.

48. The method of claim 41, further comprising:
as part of furnishing each of the electronic wagering records with a cryptographically protected proof of a certain moment of time associated with the generation of the electronic wagering record, generating an authenticated and encrypted electronic wagering record using the plaintext contents of the electronic wagering record, a private key of the party generating the electronic wagering record, and a public key of an intended recipient of the time-stamped, authenticated, encrypted electronic wagering record;
as part of furnishing each of the electronic wagering records with a cryptographically protected proof of a certain moment of time associated with the generation of the electronic wagering record, time stamping the authenticated and encrypted electronic wagering record using a clock signal and a private key of the party performing the time-stamping.

49. The method of claim 48, further comprising:
as part furnishing each of the electronic wagering records with a cryptographically protected proof of a certain moment of time associated with the generation of the electronic wagering record, after generating the authenticated and encrypted electronic wagering record and before time stamping the authenticated and encrypted electronic wagering record, conveying the authenticated and encrypted electronic wagering record from a first device which generated the authenticated and encrypted electronic wagering record to a second device which performs the time-stamping.

50. The method of claim 41, further comprising:
as part of a player placing a wager, generating, with a certain device belonging to the distributed domain, an electronic wagering record that contains the player's prediction of the outcome of the incident,
producing a time-stamped electronic wagering record by furnishing, within said certain device belonging to the distributed domain, the generated electronic wagering record with a cryptographically protected proof of a certain moment of time associated with the generation of the electronic wagering record;
conveying the generated and time-stamped electronic wagering record from said certain device belonging to the distributed domain to the central domain;
responsive to the cryptographically protected proof of a certain moment of time showing that said certain moment of time was not later in time than the entry deadline, accepting, within the central domain, the generated and time-stamped electronic wagering record as valid;
within the central domain and after the outcome of the incident is known, responsive to the generated and time-stamped electronic wagering record being accepted as valid, determining whether the generated and time-stamped electronic wagering record contains a correct prediction of the outcome of the incident.

51. The method of claim 41, further comprising:
as part of a player placing a wager, generating, with a certain first device belonging to the distributed domain, an electronic wagering record that contains the player's prediction of the outcome of the incident;
conveying the generated electronic wagering record from said first device belonging to the distributed domain to a second device belonging to the distributed domain;
producing a time stamped electronic wagering record by furnishing, within said second device belonging to the distributed domain, the generated electronic wagering record with a cryptographically protected proof of a certain moment of time associated with the generation of the electronic wagering record;
conveying the generated and time-stamped electronic wagering record from said second device belonging to the distributed domain to the central domain;
responsive to the cryptographically protected proof of a certain moment of time showing that said certain moment of time was not later in time than the entry deadline, accepting, within the central domain, the generated and time-stamped electronic wagering record as valid;
responsive to the generated and time-stamped electronic wagering record being accepted as valid, within the central domain and after the outcome of the incident is known, determining whether the generated and time-stamped electronic wagering record contains a correct prediction of the outcome of the incident.

52. The method of claim 41, further comprising:
as part of a player placing a wager, generating, within a certain first device belonging to the distributed domain, an electronic wagering record that contains the player's prediction of the outcome of the incident;
conveying the generated electronic wagering record from said first device belonging to the distributed domain to a second device belonging to the distributed domain;
producing a time-stamped electronic wagering record by furnishing, within said second device, belonging to the distributed domain, the generated electronic wagering record with a cryptographically protected proof of a certain moment of time associated with the generation of the electronic wagering record;
conveying the generated and time-stamped electronic wagering record from said second device belonging to the distributed domain back to said first device belonging to the distributed domain;
conveying the generated and time-stamped electronic wagering record from the first device belonging to the distributed domain to the central domain;
responsive to the cryptographically protected proof of a certain moment of time showing that said certain moment of time was not later in time than the entry deadline, accepting, within the central domain, the generated and time-stamped electronic wagering record as valid; and
responsive to the generated and time-stamped electronic wagering record being accepted as valid, within the central domain and after the outcome of the incident is known, determining whether the generated and time-stamped electronic wagering record contains a correct prediction of the outcome of the incident.

53. The method of claim 41, further comprising:
as part of furnishing each of the electronic wagering records with a cryptographically protected proof of a certain moment of time associated with the generation of the electronic wagering record,
generating a clock signal within a protected integrated circuit;
receiving an electronic wagering record into said protected integrated circuit;
furnishing said electronic wagering record with a cryptographically protected proof of a certain moment of time by reading from a storage location within said protected integrated circuit and using said clock signal generated within said protected integrated circuit, and
outputting the electronic wagering record furnished with a cryptographically protected proof of a certain moment of time from said protected integrated circuit.

54. The method of claim 41, further comprising:
a) transmitting a begin signal from the central domain to the distributed domain;
b) generating, within the distributed domain, a plurality of electronic wagering record each furnished with a cryptographically protected proof of a certain moment of time associated with the generation of the electronic wagering record;
c) transmitting an end signal from the central domain to the distributed domain; and
d) transmitting from the distributed domain to the central domain the electronic wagering records generated before the reception of said end signal.

55. The method of claim 45, further comprising:
after (c) but before (d), (c1) transmitting an outcome signal from the central domain to the distributed domain.

56. The method of claim 55, further comprising:
after (c1), calculating, with a certain device belonging to the distributed domain, a preliminary betting result on the basis of the received outcome signal the electronic wagering records generated in (b) in said certain device belonging to the distributed domain.

57. The method of claim 56, further comprising:
After (c) but before (d), transmitting a game closed signal from the central domain to the distributed domain; wherein (d) is only performed responsive to receiving said game closed signal within the distributed domain.

58. The method of claim 54, further comprising:
before (a), registering a plurality of user of terminal arrangements belonging to the distributed domain as registered users of a betting system belonging to the central domain; and
setting up at the central domain a user account for each registered user.

59. The method of claim 54, further comprising:
before (a), transmitting from the central domain to the distributed domain a preliminary announcement of an oncoming begin signal; and
before (a), responding to the preliminary announcement within the distributed domain by transmitting to the central domain messages indicating the willingness to react to such a begin signal by generating electronic wagering records.

60. A computer program product stored on a tangible medium, comprising software code portions configured to cause a computer to perform the method of claim 41 when said product is run on the computer.

61. A computer program product stored on a tangible medium, comprising software code portions configured to cause a computer to perform the method of claim 50 when said product is run on the computer.

62. A computer program product stored on a tangible medium, comprising software code portions configured to cause a computer to perform the method of claim 51 when said product is run on the computer.

63. A computer program product stored on a tangible medium, comprising software code portions configured to cause a computer to perform the method of claim 52 when said product is run on the computer.

64. A terminal arrangement for a wagering system, comprising:
an input device configured to receive a player's prediction of the outcome of an incident;
a processor in communication with the input device, the processor configured to receive from the input device the player's prediction of the outcome of an incident, and further configured to generate an electronic wagering record that contains the player's prediction of the outcome of an incident;
a transmitter in communication with the processor and configured to transmit the electronic wagering record to a central domain;
a protected integrated circuit in communication with the processor, the protected integrated circuit configured to furnish the electronic wagering record, before the electronic wagering record is transmitted to the central domain, with a cryptographically protected proof of a certain moment in time associated with the generation of the electronic wagering record; and
a transceiver configured to communicate with a device belonging to a central domain, said transceiver configured to perform operations belonging to a category of Media Access Control operations, said transceiver being coupled to said protected integrated circuit and configured to provide said protected integrated circuit with the clock signal, said transceiver also being configured to be used in synchronising at least one operation belonging to said category of Media Access Control operations, wherein the protected integrated circuit is further configured to cryptographically combine the clock signal with the electronic wagering record that contains the prediction of the outcome of the certain incident;
wherein the electronic wagering record will only be accepted as valid within the central domain if the cryptographically protected proof of a certain moment of time associated with the generation of the electronic wagering record shows that said certain moment of time was not later in time than an entry deadline before the outcome of the incident is known.

65. The terminal arrangement of claim 64, wherein the protected integrated circuit further includes an internal clock signal source and is further configured to cryptographically combine the output of the internal clock signal source to the electronic wagering record that contains the prediction of the outcome of the certain incident.

66. The terminal arrangement of claim 64, further comprising:
a receiver coupled to the protected integrated circuit and configured to receive an external clock signal,
wherein the protected integrated circuit further is further configured to cryptographically combine an external clock signal with the electronic wagering record that contains the prediction of the outcome of the certain incident.

* * * * *